US010859290B2

(12) United States Patent
Herweck et al.

(10) Patent No.: US 10,859,290 B2
(45) Date of Patent: Dec. 8, 2020

(54) PERSONAL AMBIENT AIR TEMPERATURE MODIFICATION DEVICE

(71) Applicant: Airwirl, LLC, North Palm Beach, FL (US)

(72) Inventors: Steve A. Herweck, Wellesley Hills, MA (US); Dana Herweck, Wellesley Hills, MA (US); Michael McCarthy, Palm Beach Gardens, FL (US)

(73) Assignee: Airwirl, LLC, North Palm Beach, FL (US)

( * ) Notice: Subject to any disclaimer, the term of this patent is extended or adjusted under 35 U.S.C. 154(b) by 129 days.

(21) Appl. No.: 15/699,472

(22) Filed: Sep. 8, 2017

(65) Prior Publication Data

US 2018/0073769 A1    Mar. 15, 2018

Related U.S. Application Data

(60) Provisional application No. 62/385,669, filed on Sep. 9, 2016.

(51) Int. Cl.
*F24H 7/04* (2006.01)
*F24F 5/00* (2006.01)
(Continued)

(52) U.S. Cl.
CPC ............. *F24H 7/04* (2013.01); *F24F 5/0017* (2013.01); *F24F 6/00* (2013.01); *F24F 7/007* (2013.01);
(Continued)

(58) Field of Classification Search
CPC ......... F24H 7/04; F24F 5/0017; F24F 5/0021; F24F 2221/38
(Continued)

(56) References Cited

U.S. PATENT DOCUMENTS 1,922,790 A    8/1933   Alger
4,711,099 A  * 12/1987  Polan .................... F25D 15/00
                                              62/293
(Continued)

FOREIGN PATENT DOCUMENTS

CN          1047730        12/1990
CN          1675109         9/2005
(Continued)

OTHER PUBLICATIONS

Translation of WO2016113771A1 entitled Translation—WO2016113771A1 (Year: 2019).*
(Continued)

*Primary Examiner* — Paul Alvare
(74) *Attorney, Agent, or Firm* — Morse, Barnes-Brown & Pendleton, P.C.; Sean D. Detweiler, Esq.

(57) ABSTRACT

A personal, portable, ambient air temperature modification heating or cooling device provides heated or cooled air flow from a modified ambient temperature source disposed inside a container configured to fit in a conventional cup holder. The device pulls in ambient temperature air into an internal chamber of the device where the ambient temperature air is cooled or warmed through heat transfer from thermal energy storage components in the internal chamber, then thermally concentrated prior to entering a motorized air movement mechanism via an air manifold, and the resulting cooled or warmed air is returned out from the internal chamber of the device and directed toward a user. The modified temperature air returned by the device provides a desired cooling or warming effect to the immediate environment nearby the user.

89 Claims, 6 Drawing Sheets

(51) Int. Cl.
  *F24F 7/08* (2006.01)
  *F24F 6/00* (2006.01)
  *F24F 7/007* (2006.01)
  *F24F 3/16* (2006.01)
(52) U.S. Cl.
  CPC .............. *F24F 7/08* (2013.01); *F24F 3/1603* (2013.01); *F24F 2221/38* (2013.01); *Y02E 60/14* (2013.01)
(58) Field of Classification Search
  USPC .......................... 62/406, 457.1, 457.3, 457.4
  See application file for complete search history.

(56) References Cited

U.S. PATENT DOCUMENTS

| | | | |
|---|---|---|---|
| 5,030,389 A * | 7/1991 | Cecil | B01F 3/04085 |
| | | | 261/29 |
| 5,062,281 A * | 11/1991 | Oliphant | F24F 5/0017 |
| | | | 62/406 |
| 5,857,350 A | 1/1999 | Johnson et al. | |
| 5,953,933 A | 9/1999 | Cheng | |
| 6,067,813 A * | 5/2000 | Smith | A45C 11/20 |
| | | | 62/371 |
| 6,227,004 B1 * | 5/2001 | Gerstein | A47G 19/2288 |
| | | | 62/421 |
| 6,726,112 B1 * | 4/2004 | Ho | F24F 11/0086 |
| | | | 236/94 |
| 6,971,249 B1 | 12/2005 | Blackstone | |
| 7,127,910 B2 | 10/2006 | Urfig | |
| 7,246,505 B2 | 7/2007 | Navedo et al. | |
| 7,311,526 B2 * | 12/2007 | Rohrbach | H01R 13/6205 |
| | | | 439/39 |
| 8,544,286 B2 * | 10/2013 | Janssen | A61J 1/165 |
| | | | 62/130 |
| 2003/0230109 A1 | 12/2003 | Link | |
| 2004/0107707 A1 * | 6/2004 | Richardson | A23L 3/3418 |
| | | | 62/62 |
| 2005/0150251 A1 | 7/2005 | Navado et al. | |
| 2006/0123832 A1 | 6/2006 | Urfig | |
| 2006/0254306 A1 | 11/2006 | Urfig | |
| 2007/0044503 A1 * | 3/2007 | McCarrell | F24F 5/0017 |
| | | | 62/420 |
| 2007/0180840 A1 * | 8/2007 | Shostack | A61L 9/122 |
| | | | 62/186 |
| 2008/0022712 A1 * | 1/2008 | Carr | F24F 5/0017 |
| | | | 62/425 |
| 2008/0170388 A1 * | 7/2008 | Greil | F25D 27/00 |
| | | | 362/155 |
| 2009/0056716 A1 | 3/2009 | Carrier | |
| 2009/0078120 A1 | 3/2009 | Kummer et al. | |
| 2009/0143004 A1 | 6/2009 | Tam et al. | |
| 2010/0050750 A1 | 3/2010 | Saaski | |
| 2010/0175556 A1 * | 7/2010 | Kummer | B01D 46/2411 |
| | | | 95/273 |
| 2011/0030413 A1 * | 2/2011 | Heil | F24F 5/0017 |
| | | | 62/407 |
| 2011/0180069 A1 * | 7/2011 | McCabe | F24F 5/0017 |
| | | | 128/204.15 |
| 2012/0031984 A1 * | 2/2012 | Feldmeier | F24F 11/30 |
| | | | 236/49.3 |
| 2012/0305414 A1 * | 12/2012 | Magnus | F25D 23/12 |
| | | | 206/216 |
| 2012/0324920 A1 * | 12/2012 | Carrubba | B60H 1/00585 |
| | | | 62/77 |
| 2013/0168882 A1 * | 7/2013 | Lykins | F04D 29/705 |
| | | | 261/136 |
| 2013/0206372 A1 * | 8/2013 | Yang | F24F 5/0017 |
| | | | 165/104.34 |
| 2014/0232022 A1 * | 8/2014 | Chung | F24F 6/12 |
| | | | 261/78.1 |
| 2014/0306636 A1 * | 10/2014 | Yu | H02P 31/00 |
| | | | 318/494 |
| 2014/0361101 A1 * | 12/2014 | Maher | F24F 6/14 |
| | | | 239/302 |
| 2015/0267961 A1 * | 9/2015 | Christian | F25D 31/008 |
| | | | 62/457.3 |
| 2015/0382096 A1 * | 12/2015 | Lamar | H04R 1/1041 |
| | | | 381/74 |
| 2016/0058134 A1 * | 3/2016 | Blunt | A44C 5/0023 |
| | | | 454/329 |
| 2016/0187046 A1 * | 6/2016 | Chen | A45C 11/20 |
| | | | 62/239 |
| 2017/0087500 A1 * | 3/2017 | Combs | F24F 3/1603 |
| 2017/0223922 A1 * | 8/2017 | Loopesko | A01K 1/0082 |
| 2018/0023579 A1 * | 1/2018 | Park | F04D 29/002 |

FOREIGN PATENT DOCUMENTS

| | | | |
|---|---|---|---|
| CN | 103260760 | 8/2013 | |
| CN | 205351565 | 6/2016 | |
| GB | 237765 A * | 8/1925 | ............ F24F 5/0017 |
| WO | WO-2016113771 A1 * | 7/2016 | ............ B65D 23/08 |

OTHER PUBLICATIONS

Online Publication cited by Wayback Machine Jul. 8, 2016 entitled "Wynd" (Year: 2019).*
Baby Stroller Cooling System Upgrade Kit: Baby, https://www.amazon.com/Baby-Stroller-Cooling-System-Upgrade/dp/B0041BCF9I#immersive-view_1469102723193, 5 pages, retrieved from the World Wide Web on Jan. 19, 2018.
Thermos 24 Ounce Hydration Bottle with Connected Smart Lid, https://www.amazon.com/Thermos-Ounce-Hydration-Bottle-Connected/dp/B00ZQUNHO0/ref=as_ll_ss_tl?th=1&linkCode=sl1&tag=usatsyndication-20&linkid=11127351715fbef51c07215767e40624, 8 pages, retrieved from the World Wide Web on Jan. 19, 2018.
Personal Cooling Fan, http://www.myhandycooler.com/products_babystroller.html, 1 page, retrieved from the World Wide Web on Jan. 19, 2018.
My Chill Personal Space Coolers, http://www.homedics.com/mychill.html, 5 pages, retrieved from the World Wide Web on Jan. 19, 2018.
LED Bluetooth Speaker Fan, http://www.kolmon.net/led-bluelooth-speaker-fan-p00152p1.html, 4 pages, retrieved from the World Wide Web on Jan. 19, 2018.
Buy No Leaf Air Condition Bladeless Fan & Room Freshener, http://www.kharidlay.com/Unique-Prod/No-leaf-Air-Conditon-Bladeless-Fan--Room-Freshener-id-266080.html, 2 pages, retrieved from the World Wide Web on Jan. 19, 2018.
Portable Mini USB Foldable Hand-held Fan Coller Rechargeable Air Conditioner, https://www.ebay.com/itm/Portable-Mini-USB-Foldable-Hand-held-Fan-Cooler-Rechargeable-Air-Conditioner-/382077768934?_trksid=p2141725.m3641.l6368, 3 pages, retrieved from the World Wide Web on Jan. 19, 2018.
Portable 2 in 1 USB Mini Humidifier Air Cooling Mister Fan, https://tyloc.en.alibaba.com/product/60422106008-803134035/Portable_2_in_1_USB_Mini_Humidifier_Air_Cooling_Mister_Fan.htm?spm=a2700.8304367.prewdfa4cf.23.38557dbawz9Rs9, 12 pages, retrieved from the World Wide Web on Jan. 19, 2018.
Unifire® Mini Portable USB Rechargeable Hand Held Air Conditioner Summer Coller Fan, https://www.amazon.com/dp/B00VV9AYL90/ref=cm_sw_su-dp?tag=duiwath-20, 6 pages, retrieved from the World Wide Web on Jan. 19, 2018.
Cool on the Go? Clip Fan—Next Generation, https://www.amazon.com/dp/B007OWTTAO/ref=cm_sw_su_dp?tag=relprods-20, 8 pages, retrieved from the World Wide Web on Jan. 19, 2018.
The Original Handy Cooler Small Fan & Mini-Air Conditioner, https://www.amazon.com/Original-Handy-Cooler-Mini-Air-Conditioner/dp/B003KCT4UC, 8 pages, retrieved from the World Wide Web on Jan. 19, 2018.
The Zero Breeze Portable Air Conditioner, https://www.ireviews.com/review/zero-breeze, 8 pages, retrieved from the World Wide Web on Jan. 19, 2018.
World's First Personal Air Conditioner, https://www.indiegogo.com/projects/world-s-first-personal-air-conditioner#/, 8 pages, retrieved from the World Wide Web on Jan. 19, 2018.

(56) References Cited

OTHER PUBLICATIONS

International Search Report from PCT/US2017/050730, dated Dec. 20, 2017.
New Comfort Blue Mini Desktop Water Based Air Purifer Humidifier Aroma Therapy and Air Cleaner, https://www.amazon.com/New-Comfort-Desktop-Purifier-Humidifier/dp/B077NQ2S7G, 8 pages, retrieved from the World Wide Web on Jun. 14, 2019.
WYND—The Smartest Air Purifier for your Personal Space, https://shop.hellowynd.com, 12 pages, retrieved from the World Wide Web on Jul. 23, 2019.
This personal air purifier and air quality tracker helps you breathe easier, <https://www.reviewed.com/smarthome/content/this-personal-air-purifier-and-air-quality-tracker-helps-you-breathe-easier>, 2 pages, retrieved from the World Wide Web on Jul. 23, 2019.
Breathe—World's smallest wearable air purifier, https://www.indiegogo.com/projects/breathe-world-s-smallest-wearable-air-purifier#/, 7 pages, retrieved from the World Wide Web on Jul. 23, 2019.
International Search Report from PCT/US2019/040481, dated Sep. 13, 2019.
Non-Final Office Action U.S. Appl. No. 16/502,307, dated Jan. 16, 2020.
International Search Report from PCT/US2019/063718, dated Feb. 4, 2020.
Notice of Allowance from U.S. Appl. No. 16/502,307, dated Apr. 2, 2020.

\* cited by examiner

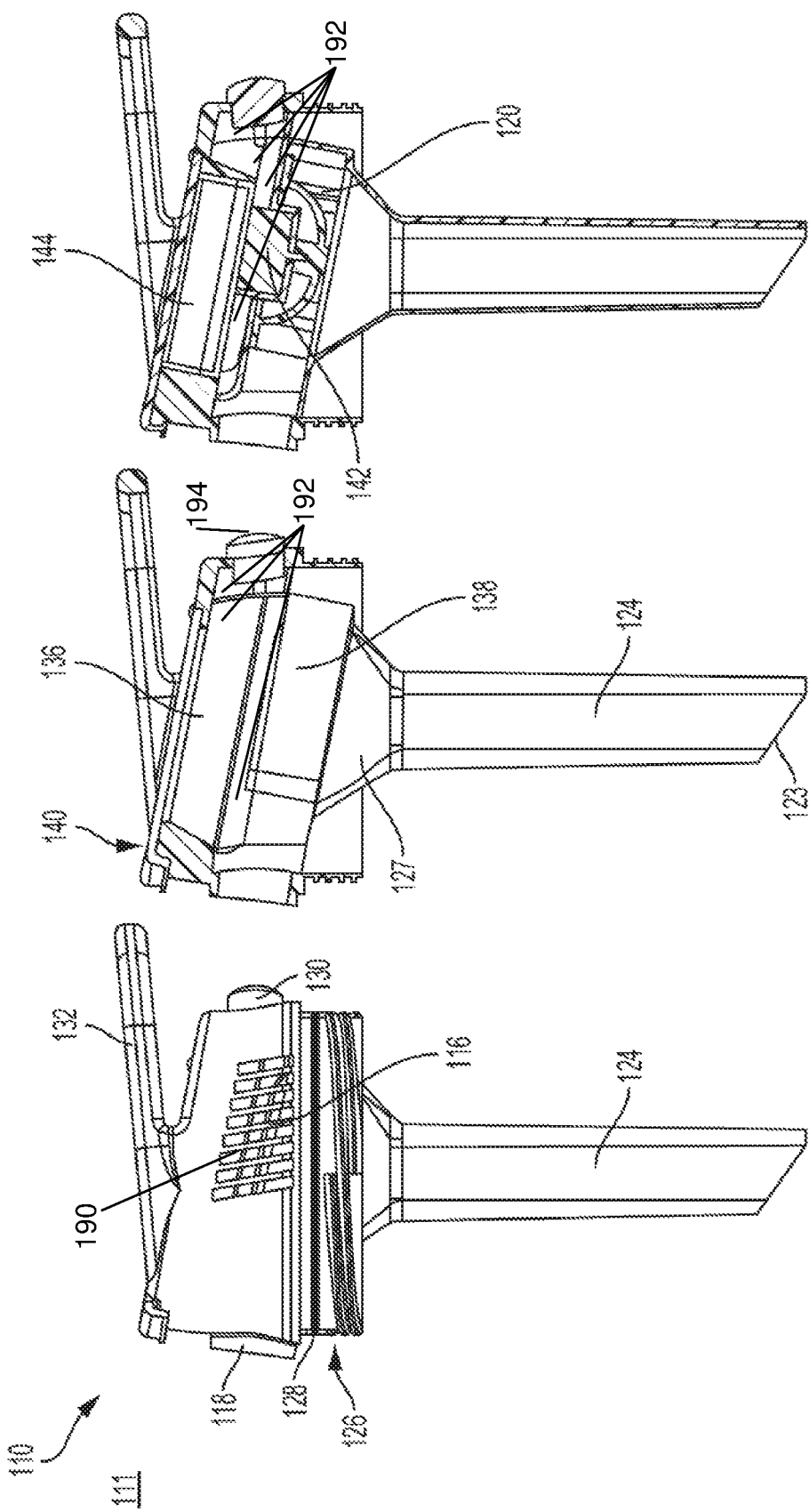

ent invention provides a portable personal heating and
PERSONAL AMBIENT AIR TEMPERATURE MODIFICATION DEVICE

CROSS-REFERENCE TO RELATED APPLICATION(S)

This application claims priority to, and the benefit of, U.S. Provisional Application No. 62/385,669, filed Sep. 9, 2016, for all subject matter common to both applications. The disclosure of said provisional application is hereby incorporated by reference in its entirety.

FIELD OF THE INVENTION

The present invention relates to a personal ambient air temperature modification device suitable for providing heating or cooling to a user. In particular, the present invention relates to a personal heating or cooling device that provides heated or cooled air flow from a thermal energy storage source disposed in a compact and easily portable handheld device that is adapted to fit within conventional cup holders, such as would be found in an automobile or the like.

BACKGROUND

Generally, personal cooling or heating devices come in a variety of shapes, sizes and functionalities designed with the intended purpose to cool or heat the associated user. Users frequently utilize such devices while traveling, attending events during long periods outside, and all day functions, etc. For example, depending on the time of year, users attending work, amusement parks, hiking, sporting events, concerts, etc. may desire to take advantage of the benefits of portable cooling or heating devices. Examples of conventional personal cooling devices include portable fans, spray bottles, cooling towels, etc. Examples of conventional personal heating devices and heating methods include chemically activated hand warmers, rechargeable battery operated hand warmers, battery operated thermal heaters found in fabric, gloves, boots and jackets that provide short term heat in close contact, various hats, gloves, scarves, etc. Any of the example devices or methods can also be combined to provide additional heating or cooling for the user.

However, these devices and methodologies experience some shortcomings. For example, several of the battery operated personal fans that are available can be carried and/or clipped onto an apparatus (e.g., a stroller element) by a user in close proximity to the user; however, such fan designs merely blow ambient temperature air from the surrounding area and do not actually provide heated or cooled air to the user. Similarly, some personal fan devices that can also be combined with a sprayer, sponge, or towel to be wet with water prior to use (or used individually without a fan) to provide evaporative air effects of airflow out from the fan. However, such devices do not adequately modify ambient temperature air as they are only simple fans and/or evaporative cooling effects, and they are incapable of heating air and cooling air with a single handheld device. There are numerous other shortcomings associated with such conventional products as is well understood by those of skill in the art and by consumers of such products generally.

SUMMARY

There is a need for a portable personal device that provides heating and/or cooling to a user with air heated or cooled from surrounding ambient temperature to a modified temperature, in a device that is compact, portable, able to be comfortably handheld, and configured to fit within a conventional cup holder. The present invention is directed toward further solutions to address this need, in addition to having other desirable characteristics. Specifically, the present invention provides a portable personal heating and cooling device that operates in combination with an insulated container, or the like, to provide improved heating and cooling to a user for an extending period of time. The device of the present invention includes a motorized lid for the container that provides an air flow, e.g., using a motorized air movement mechanism such as a fan or other powered air movement mechanism, of cool or hot air created from the ambient temperature passing through an interior volume the container, the interior volume containing a cooling or heating thermal energy storage component and an elongate air manifold.

In accordance with example embodiments of the present invention, personal ambient air temperature modification device is provided. The device includes a container adapted to be handheld. The container includes one or more thermally insulated walls defining an interior volume, each of the one or more thermally insulated walls having an interior side facing the interior volume and an exterior side opposite the interior side, an opening disposed through a first end of the container, and a base disposed at a second end of the container opposite the first end, the base having an interior side facing the interior volume and an exterior side opposite the interior side. The container is sized, dimensioned, and adapted to fit in a cup holder. The device also includes a lid with an interior side facing the interior volume and an exterior side opposite the interior side, the lid removably and replaceably covering the opening in such a way that obstructs the opening when in a sealed position and exposes the opening when removed from the container. The lid includes a return port, an air inlet, and a motorized air movement mechanism disposed inside the lid that draws air through the air inlet and exhausts return air through the return port to an external environment external to the container and the lid. The device further includes at least one air intake port in fluid communication with the interior volume of the container, the at least one air intake port positioned to draw supply air from an ambient environment external to the device to flow into the interior volume of the container. The device also includes a thermal energy concentrator disposed in the interior volume of the container. The thermal energy concentrator includes an elongate air manifold having an air funnel opening at a first end and an intake opening at a second end, the air funnel opening fluidly coupled with the air inlet and the intake opening fluidly coupled with the interior volume of the container. When the lid is in the sealed position on the container, the motorized air movement mechanism is operating, and one or more thermal energy storage components are disposed in the interior volume of the container, then ambient air is drawn through the at least one air intake port, into the interior volume of the container and across the one or more thermal energy storage components, through the intake opening at the second end of the elongate air manifold, through the elongate air manifold, the ambient air being converted to thermally modified air via convection with the one or more thermal energy storage components and the elongate air manifold, the thermally modified air then continuing through the air funnel opening, into the air inlet, and out through the return port as return air having a different temperature from the ambient air drawn through the at least one air intake port.

In accordance with aspects of the present invention, the return air has a different temperature from the ambient air drawn through the at least one air intake port comprises a temperature difference of at least 2 degrees Fahrenheit. The container can have a double wall configuration with an air gap disposed between walls of the double wall configuration. The container can have a double wall configuration with one or more thermally insulating materials disposed between walls of the double wall configuration. The interior volume of the container can be one of about 10 oz, about 15 oz, about 20 oz, about 24 oz, about 30 oz, about 36 oz, about 40 oz, about 45 oz, about 50 oz, about 55 oz, or about 60 oz. The container can be manufactured of one or more of a plastic, composite, metal, rubber, elastomeric material, non-elastomeric material, or combinations thereof.

In accordance with aspects of the present invention, the device can further include a gasket seal disposed about the lid and configured to engage with the container opening when the lid is in a sealed position on the container. The device can further include an elastomer gasket seal disposed about the lid and configured to engage with the container opening when the lid is in a sealed position on the container, the elastomer gasket seal providing vibration dampening, noise reduction, and thermal preservation between the container opening and the lid. The device can further include a mechanical coupling between the lid and the container consisting of one of a via a friction or interference fit, a latch mechanism, or a threaded coupling. The device can further include a thermally insulating insert disposed in the lid proximate the interior side facing the interior volume. The thermally insulating insert can include a non-toxic insulating plastic foam insert, an insulating composite material, or combinations thereof. The thermally insulating insert can be vibration-dampening, sound dampening, or both. The thermally insulating insert can include one or more air intake channels providing fluid communication between the at least one air intake port and the interior volume of the container when the lid is in the sealed position on the container. The thermally insulating insert can be removable, washable, and reusable.

In accordance with aspects of the present invention, the motorized air movement mechanism includes a centrifugal fan having curved fan blades, flat fan blades, or combinations thereof. The thermal energy concentrator can be comprised of a porous material or a non-porous material. The thermal energy concentrator can include a plurality of perforations throughout its length.

In accordance with aspects of the present invention, the elongate air manifold can have one central channel fluidly coupling air funnel at the first end with the intake opening at the second end. The elongate air manifold can have a plurality of channels fluidly coupling air funnel at the first end with the intake opening at the second end. The elongate air manifold can have a plurality of side wall openings. The elongate air manifold can have a plurality thermally conductive surface features. The elongate air manifold can have a plurality thermally conductive surface features comprising one or more of fins, contours, finger projections, or combinations thereof, which increase a thermally conductive surface area of the elongate air manifold relative to a smooth and linear surface. The elongate air manifold can have a tapered configuration with a narrower end of the tapered configuration being proximate the intake opening at the second end in such a way that the tapered configuration is an ice deflector when the container is filled with ice cubes, crushed ice, and or shaved ice, such that the elongate air manifold pushes aside the ice as the lid is coupled with the container. The elongate air manifold can further include attachment means in the form of posts, slots, ribs, or cups disposed along an outer surface of the elongate air manifold for engaging with the one or more thermal energy storage components disposed inside the container. The device can further include a return air delivery tube removably and replaceably coupled with the return port.

In accordance with aspects of the present invention, the thermal energy concentrator is removably and replaceably coupled with the lid. The thermal energy concentrator can be permanently coupled with the lid. The thermal energy concentrator can be removably and replaceably coupled with the lid via a friction or interference fit, a latch mechanism, or a threaded coupling. The thermal energy concentrator can be adapted to receive thermal energy from one or more thermal energy storage components disposed in the interior volume of the container. The thermal energy concentrator can be adapted to receive thermal energy from one or more thermal energy storage components disposed in the interior volume of the container, the one or more thermal energy storage components comprising a warm or cold gel pack, iron oxide pouches for generating heat, ice, or combinations thereof The thermal energy concentrator can be adapted to receive thermal energy from one or more thermal energy storage components that are folded.

In accordance with aspects of the present invention, the device further includes a battery storage chamber. The device can further include a rechargeable battery storage disposed in the device. The device can further include a wireless communication component coupled with a control mechanism that is controlling motorized air movement mechanism operation in such a way that the motorized air movement mechanism is controllable by separate device in wireless communication with the control mechanism via the wireless communication component. The device can further include a wireless communication component configured to wirelessly communicate using one or more of radio frequency (RF), Wi-Fi®, cellular, Bluetooth®, Bluetooth Low Energy®, personal area network (PAN), short-wavelength UHF, or combinations thereof. The device can further include a battery cover door having a magnetic power cord receiver coupling equipped for magnetic power cord attachment for battery charging. The device can further include a weather resistant, or waterproof, battery cover door when in a sealed and closed position on the lid.

In accordance with aspects of the present invention, external sides of the lid include a battery cover door, weather resistant switch(es), protruding rib elements and handle(s) are constructed of non-heat absorbing materials, finishes, or colors to reduce heat absorption by the lid in extreme ambient temperatures or sunlight. The device can further include one or more movable doors positioned and configured to close or open access to the at least one air intake port, for maintaining thermal energy stored inside the container by closing the one or more movable doors. The device can further include a microphone configured receive voice commands translated to commands for a control mechanism controlling operation of the motorized air movement mechanism. The device can weigh less than 10 lbs, preferably less than 5 lbs, and more preferably less than 2 lbs. The device can further include a weather resistant on/off switch for controlling the operation of the motorized air movement mechanism.

In accordance with aspects of the present invention, the device can further include one or more weather resistant on/off switches, variable speed switches, one or more weather resistant switches with LED indicator, one or more weather resistant switches with digital display screen, one or more timer configured to control on/off operation of the motorized air movement mechanism, or combinations thereof. The device can further include a power receiver port selected from the group consisting of USB, micro-USB, multi-pin dock connector, and lighting power connector. The device can further include a solar power generation source coupled with the personal ambient air temperature modification device. The device can further include a non-slip vibration absorption or vibration dampening base disposed on a bottom surface of the personal ambient air temperature modification device upon which the device rests when placed on a surface.

In accordance with aspects of the present invention, the device can further include a carry handle extending from the lid. The device can further include a carry handle extending from the lid wherein the carry handle is configured to enable horizontal placement of the personal ambient air temperature modification device onto a flat surface without rolling. The device can further include a carry handle extending from the lid wherein the carry handle is configured to block accidental on/off switch activation and block accidental power cord dislodgment when connected to an external power source. The device can further include a carry handle extending from the lid, wherein the carry handle and battery cover tab are sized, dimensioned, configured, and adapted to support a mobile phone or mobile tablet device at a sufficient viewing angle on top of the tab and lid during operation of the personal ambient air temperature modification device.

In accordance with aspects of the present invention, the device can further include a night light. The device can further include a removable insulating jacket cover sized, dimensioned, and configured to fit around the personal ambient air temperature modification device. The device can further include a temperature sensor disposed on the personal ambient air temperature modification device for sensing air temperature. The device can further include an ultrasonic electronic water mist generator for supplying water mist to the return port. The device can further include an aromatic diffuser means for supplying aroma to the return port. The device can further include an air filter. The device can further include an air filter coupled with the return port, to an attachable delivery tube, or both. The device can further include a washable and reusable air filter. The device can further include a disposable air filter. The device can further include an air filter comprised of carbon components. The device can further include a HEPA air filter.

In accordance with aspects of the present invention, the device is powered with rechargeable batteries, chargeable wirelessly or with a wired connection to a charger. The device can further include a battery life indicator display. The device can further include a temperature display. The device can modify ambient air temperature by at least 2 degrees Fahrenheit. The device can further include a water mist generator coupled with a condensation or liquid source. The device can further include a door that is closeable to block the at least one air intake port and openable to provide access to the at least one air intake port in such a way that the door can be closed when the personal ambient air temperature modification device, thereby preserving thermal energy within the container.

In accordance with aspects of the present invention, the elongate air manifold includes one or more thermal energy generating device attachment means for placement within and removal from the container. The personal ambient air temperature modification device can be configured to provide localized body temperature modification of 2 degrees or greater. The motorized air movement mechanism can be structured in a turbine fan configuration of fan blades. When the return port is placed close enough to a living thing to effect a topical temperature change or surface temperature effect of 2 degrees or greater.

In accordance with example embodiments of the present invention, personal ambient air temperature modification device is provided. The device includes a container adapted to be handheld. The container includes one or more thermally insulated walls defining an interior volume, each of the one or more thermally insulated walls having an interior side facing the interior volume and an exterior side opposite the interior side, an opening disposed through a first end of the container, and a base disposed at a second end of the container opposite the first end, the base having an interior side facing the interior volume and an exterior side opposite the interior side. The container is sized, dimensioned, and adapted to fit in a cup holder. The device also includes a lid with an interior side facing the interior volume and an exterior side opposite the interior side, the lid removably and replaceably covering the opening in such a way that obstructs the opening when in a sealed position and exposes the opening when removed from the container. The lid includes a return port, an air inlet, and a motorized air movement mechanism disposed inside the lid that draws air through the air inlet and exhausts return air through the return port to an external environment external to the container and the lid. The device further includes at least one air intake port in fluid communication with the interior volume of the container, the at least one air intake port positioned to draw supply air from an ambient environment external to the device to flow into the interior volume of the container. The device also includes a thermal energy concentrator disposed in the interior volume of the container. The thermal energy concentrator includes a multi-channel directional airflow manager having a central air channel coupled with the air inlet and the surrounded by a plurality of fins and storage chambers coupled with the interior volume of the container. When the lid is in the sealed position on the container, the motorized air movement mechanism is operating, and one or more thermal energy storage components are disposed in the plurality of storage chambers within the interior volume of the container, then ambient air is drawn through the plurality of airflow chambers, into the interior volume of the container and across the one or more thermal energy storage components, through the central air channel of the multi-channel directional airflow manager, the ambient air being converted to thermally modified air via convection with the one or more thermal energy storage components, the thermally modified air then continuing through the central air channel, into the air inlet, and out through the return port as return air having a different temperature from the ambient air drawn through the at least one air intake port.

In accordance with aspects of the present invention, the plurality of storage chambers are created by the plurality of fins. The device can further include a plurality of airflow channels coupling the plurality of storage chambers with the central air channel. The multi-channel directional airflow manager can be a fixed portion of the container. The multi-channel directional airflow manager can be a removable portion of the container. The multi-channel directional airflow manager can be the thermal energy storage components In accordance with aspects of the present invention, the device further includes a wireless, battery operated Bluetooth® or Wi-Fi® enabled speaker for use during operation of the motorized air movement mechanism. The rechargeable batteries can be configured to charge a rechargeable battery operated device such as a cell phone, or tablet, or computing device either by wire connection or by wireless charging means. The device can further include a printed circuit board containing LEDs, battery connections, plug outlet, Wi-Fi®, and Bluetooth® components within the lid. The device can further include a motor speed indicator (LED), a Wi-Fi® connection indicator or display, and/or an on/off indicator (LED). The device can further include a medication diffuser for supplying various medicines to a user through the return port. The device can further include an illuminated power icon button that lights up when touched and turns off after a predetermined period of time. The device can further include an LED power indicator that is illuminated when the device is on and not illuminated when the device is off. The power indicator can be a halo around the on/off switch button.

In accordance with aspects of the present invention, the device further includes one or more LED indicators for indicating remaining battery power or speed of the motorized air movement mechanism. The device can further include an internal temperature sensor coupled to a temperature LED, the temperature LED illuminating cool colors for cool air temperature and warm colors for warm air temperature. The device can further include a weather resistant soft touch coating for providing a non-slip grip when the container or the lid is wet. The weather resistant soft touch coating can be on 5% of greater of an external surface of the lid. The container can be sized to fit a variety of hand sizes by shape. The shape can include at least one of round, square, contoured, hexagonal, flared, contoured, or textured. The container can have a vibration absorption base to container width of greater than 80% up to 150%. A length to width ratio of the elongate air manifold length can be greater than 10% of a diameter of the motorized air movement mechanism. The device can further include a weather resistant battery cover with hinge and clip closure with anti-vibration and temperature preservation and sound insulating properties.

In accordance with example embodiments of the present invention, a personal ambient air temperature modification device is provided. The device includes a container. The container includes one or more thermally insulated walls defining an interior volume, each of the one or more thermally insulated walls having an interior side facing the interior volume and an exterior side opposite the interior side and an opening disposed through a first end of the container. The container also includes a lid with an interior side facing the interior volume and an exterior side opposite the interior side, the lid removably and replaceably covering the opening in such a way that obstructs the opening when in a sealed position and exposes the opening when removed from the container. The lid includes a motorized air movement mechanism and a network of closed compartments configured to prevent ambient temperature air water condensation and modified temperature air water condensation from contact with components located within the network of closed compartments. The components located within the network of closed compartments include at least the one or more electrically connected switches, printed circuit boards (PCBs), light emitting diodes (LEDs), and batteries are encased within the network of closed compartments.

In accordance with the present invention, the various embodiments disclosed and described herein are considered to be interchangeable in any operable combination and to fall within the scope of the present invention, as would be appreciated by those of skill in the art.

BRIEF DESCRIPTION OF THE FIGURES

These and other characteristics of the present invention will be more fully understood by reference to the following detailed description in conjunction with the attached drawings, in which:

FIG. 2A is a side view of lid and elongate air manifold components of the device of FIG. 1;

FIGS. 2B, 2C, 2D, and 2E are cut-away illustrations of the lid and air manifold components shown in FIG. 2A;

DETAILED DESCRIPTION

Figure 1:
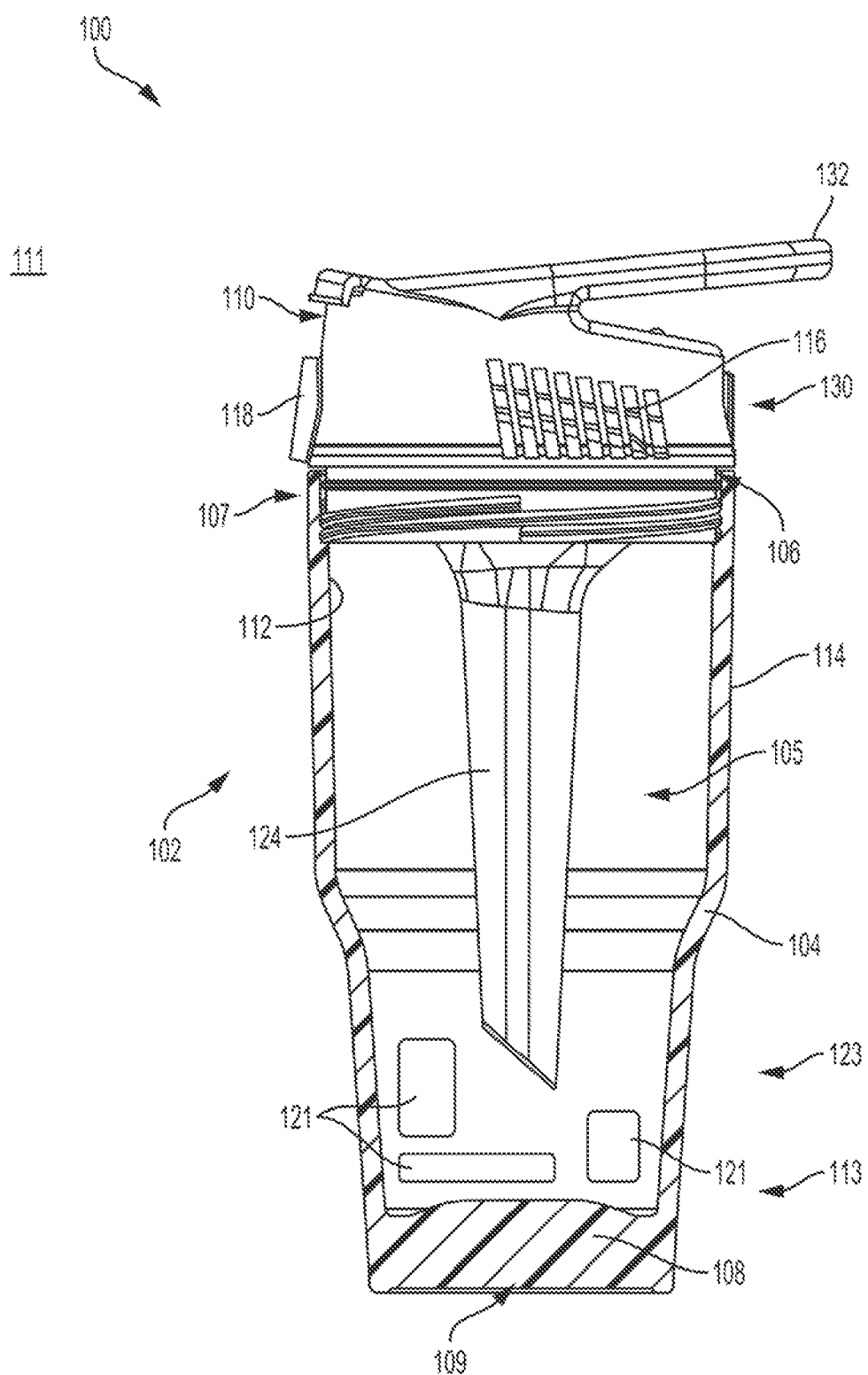
FIG. 1 is cross-sectional view of a personal ambient air temperature modification device in accordance with embodiments of the present invention.

An illustrative embodiment of the present invention relates to a personal ambient air temperature modification device. The device includes a removable motorized lid in combination with an insulated container, such as a handheld liquid or ice container (e.g., a tumbler, thermos, etc.). The lid includes a powered or motorized air movement mechanism, such as a variable speed fan, and is coupled with an elongate air manifold that extends into an interior volume of the insulated container, where a thermal energy storage device may reside. An optional positionable, a bendable and flexible tube can be coupled with a return port to direct modified temperature airflow to a user to effect a localized beneficial temperature modification. The combined assembly of the lid, the container, the motorized air movement mechanism, the thermal energy storage, and the elongate air manifold form the device of the present invention. The assembled device provides a personal sized portable container with a container motorized lid for use with any appropriately sized thermal energy storage components (e.g., ice, iron oxide or thermal preserving gel materials, or thermal battery heat generating system) to condition or modify ambient temperature air drawn into and through the device (e.g., via an air intake and the air manifold) and be returned out to the user via an air return opening in the lid having a modified temperature (either heated or cooled from the ambient air temperature that was drawn into the device).

Additionally, an optional flexible and length extendable tube can be attached to a return port on the device to enable close proximity of modified ambient temperature air directed for close proximity personal use of the device of the present invention in different environmental temperature conditions. Furthermore, the entire device is sized, dimensioned, and configured to fit within a conventional cup holder, such as would be found in an automobile, and especially when implemented in a container embodiment. Accordingly, the present invention is configured to take advantage of the known thermal containment benefits of a double wall insulated container (such as a container handheld liquid container, or equivalent container); specifically, a container that can keep ice or warm water temperatures for an extended period of time and leverage such insulating capability to provide a heating or cooling functionality by exposing an airflow to an internal heating or cooling component with the airflow passing over the component, through an elongate air manifold, and out of the device with the lid sealed in place. The lid and the container can optionally include various vibration and sound absorption means to quite operation and provide non-slip placement on angled and/or wet surfaces, as well as provide insulated temperature preservation benefits on different temperature surfaces.

Unlike conventional personal fan systems that utilize localized airflow to merely move around ambient air, or perhaps add some water mist or vapor to leverage an evaporative cooling effect, the system and method of the present invention significantly modifies ambient air temperatures in a surrounding external environment by use of a double walled container with a motorized lid air movement assembly and unique internal air manifold that enables ambient temperature air to flow through an interior volume of the container, be heated or cooled depending on desired configuration, and be returned out from the container and delivered to a user to effect a localized temperature modification benefit, aka, heating or cooling of the air. In particular, ambient temperature air is pulled into an interior volume of the container device of the present invention, the ambient temperature air is cooled or heated by contents stored within the device (depending on whether the user desires to experience cooling or heating) and the resulting cool or warm air is returned out from the interior volume of the container device and delivered to the user. The modified air returned from the device has proven to provide sufficient ambient air temperature modification for hours with the device of the present invention. The change in ambient temperature is produced from a thermal energy storage component placed within the double wall insulated container, combined with the specifically configured elongate air manifold disposed in the interior volume and directing modified air to a return port (or coupled tube) directed at a user. In short, the present invention employs both a handheld liquid container sized motorized lid assembly with internal air channel means to effect a significant change in airflow temperatures to a user.

FIGS. 1 through 4, wherein like parts are designated by like reference numerals throughout, illustrate an example embodiment or embodiments of a personal ambient air temperature modification device, according to the present invention. Although the present invention will be described with reference to the example embodiment or embodiments illustrated in the figures, it should be understood that many alternative forms can embody the present invention. One of skill in the art will additionally appreciate different ways to alter the parameters of the embodiment(s) disclosed, such as the size, shape, or type of elements or materials, in a manner still in keeping with the spirit and scope of the present invention.

FIGS. 1-5 depict illustrative embodiment(s) of a personal ambient air temperature modification device 100, and method of use, in accordance with the present invention. In particular, FIG. 1 depicts the device 100 including a container 102 sized, dimensioned, and configured as a handheld liquid container 102 that is also sized, dimensioned, and configured to fit and be held by conventional cup holders such as would be found in automobiles, bicycles, couches, camping chairs, coolers, etc., and the like. In accordance with an example embodiment of the present invention, the container 102 includes one or more thermally insulated walls 104 defining an interior volume 105, each of the one or more thermally insulated walls 104 having an interior side 112 facing the interior volume 105 and an exterior side opposite the interior side. The interior volume 105 is configured to hold beverages and other substances (e.g., temperature modifying substance) for use by the present invention. Additionally, in one example implementation, the one or more thermally insulated walls 104 have a double-wall configuration (wherein the air gap between the walls is the mechanism by which they are considered thermally insulating, as would be understood by those of skill in the art).

The container 102 further includes an opening 106 disposed through a first end 107 of the container. A base 108 is disposed at a second end of the container 102 opposite the first end, the base 108 having an interior side 113 facing the interior volume 105 and an exterior side opposite the interior side, upon which the container 102 rests on a surface. In accordance with an example embodiment of the present invention, the container 102 further includes a non-slip vibration absorption layer 109 disposed on the exterior side of the base 108 of the container 102 configured in such a way that the container 102 rests on the vibration absorption layer 109 when sitting on a surface. The vibration absorption layer 109 is configured to minimize translation of any vibration generated by, e.g., a motorized fan 120 during operation through to the surface upon which the container 102 rests, thereby maintaining quieter operation. The vibration absorption layer also provides sound an insulated benefit by reducing the motorized fan 120 noise on a surface, hence causing quieter operation. The vibration absorption layer further provides temperature preservation insulating benefits to preserve an internal temperature of the container 102 such that external surface/ambient air temperatures do not modify the internal temperature of the container 102.

As would be appreciated by one skilled in the art, the container 102 can be designed in any geometric shape, including round, square, triangle or hexagonal shape that fits into a standard size cup holder with an interior volume 105 of about 6 oz., about 8 oz., about 10 oz, about 12 oz., about 15 oz., about 16 oz., about 20 oz., about 24 oz., about 30 oz., about 36 oz., about 40 oz., about 45 oz., about 50 oz, about 55 oz, or about 60 oz. Similarly, the ratio of the length and width of the container 102 can vary be design and preferred interior volume 105 of the container. For example, the vibration absorption layer base width to wall width ratio of the container can be greater than 80% up to 150%. Additionally, the container 102 can include a universal grip shape to allow users with different hand sizes to easily handle the container 102 regardless of hand size. For example, the container 102 can include different shapes/grips sections including but not limited to any geometric shape, tapers shapes, flared shapes, contoured shapes, etc.

As would be appreciated by one skilled in the art, the container 102, and components thereof, can be constructed from any materials known in the art and scaled to any size. For example, the container 102 can be manufactured of one or more of a plastic, composite, metal, rubber, elastomeric material, non-elastomeric material, or combinations thereof. Additionally, the container 102 can include any type of coating and/or exterior finish known in the art. For example, the container 102 can include a weather resistant soft touch coating (e.g., a two-shot hard plastic and soft elastomer areas on 5% or greater external surface area of motorized lid 110) for providing a non-slip grip in different weather conditions.

Continuing with FIG. 1, the personal ambient air temperature modification device 100 also includes a lid 110. The lid 110 removably and replaceably covers the opening 106 of the container 102 in such a way that the lid 110 obstructs the opening 106 when in a sealed position and exposes the opening 106 when in an unsealed position or removed from the container 102. The interior side 112 of the container 102 is configured to face the interior volume 105 of the container 102 and the exterior side 114 opposite the interior side 112. As would be appreciated by one skilled in the art, the lid 110 can be designed in any geometric shape, including round, square, triangle or hexagonal shape matching an opening 106 shape of a double walled thermal energy holding container 102 that fits into a standard size cup holder.

FIGS. 2A-2E depict multiple detailed illustrative examples of the lid 110 as shown in FIG. 1. In accordance with an example embodiment of the present invention, the lid 110 includes an air intake port 116, a return port 118, and a motorized air movement mechanism, such as a motorized fan 120 disposed inside the lid 110 and configured to draw air through an elongate air manifold 124 via an air inlet 122 and exhausts return air through the return port 118 to an external environment 111 of the container 102 and the lid 110. Note that the motorized air movement mechanism in the illustrative embodiment is depicted as the motorized fan 120. However, one of skill in the art will appreciate that any suitable air movement mechanism can be utilized so long as it fits within the dimensional and power requirements of the present invention. For purposes of brevity, the air movement mechanism is referred to throughout the present invention as the motorized fan 120, but the present invention is not limited to only a fan-specific mechanism. Any reference to a fan is intended to encompass all such suitable motorized air movement mechanisms, including but not limited to fans, turbines, pressurized vessels, air nozzles, air pumps, and the like.

The at least one air intake port 116 is in fluid communication with the interior volume 105 of the container 102. In particular, the at least one air intake port 116 is configured and positioned to draw supply air from an ambient external environment 111 (external to the device 100) to the device 100 into the interior volume 105 of the container 102. As would be appreciated by one skilled in the art, the at least one air intake port 116 and can include multiple cut outs, filters, and locations throughout the lid 110. For example, the at least one air intake port 116 can be disposed proximal the first end of the container 102. Likewise, the at least one air intake port 116 could be located in the upper portion of the thermally insulated wall 104 of the container 102 in addition, or as an alternative, to being disposed in the lid 110.

The return port 118 is utilized to provide the modified (e.g., heated or cooled) airflow created by the present invention to a user. The return port 118 can be fixed, articulable, or a combination thereof, to enable the user to direct the return air in a desired direction. It can also include an internally located safety grill to prevent debris or small fingers from entering the motorized fan 120 blades.

In accordance with an example embodiment of the present invention, the fan 120 is a centrifugal or turbine fan including multiple curved blades which enable improved thrust in a smaller space while creating less noise than a traditional flat blade fan design. More specifically, a compact turbine blade design enables more thermal energy convection in compact motorized fan housing with efficient vacuum generation and return port thrust, ideal for ambient temperature convection through a compact space without a large amount of air flow noise. Additionally, the centrifugal or turbine fan design enables the return port 118 to be located 90 degrees to the motor shaft for the fan 120 for compact airflow efficiency and temperature preservation of the thermally changed expelled air flow. As would be appreciated by one skilled in the art, the motorized centrifugal fan 120 can include any combination of curved fan blades, flat fan blades, or angled fan blades. Similarly, any type of fan design or other mechanism can be utilized to draw air from the external environment 111 into the device 100 and exhaust air return through the return port 118 without departing from the scope of the present invention.

As the fan 120 draws in air from the external environment 111, the fan 120 draws in modified temperature air from the interior volume 105 of the container 102 through the air inlet 122 and the elongate air manifold 124 and exhaust that air through the return port 118. The air inlet 122 is positioned underneath a center point of the fan 120 and can be located at any location on the intake side of the fan 120. The fan 120 draws are in through the air inlet 122 proximate to the center of the fan 120 blades and then distributes the air out along the fan blades to the return port 118 When the lid 110 is in the sealed position on the container 102, the motorized centrifugal fan 120 is operating, and one or more thermal energy storage components 121 are disposed in the interior volume 105 of the container 102, then ambient air from the external environment 111 is drawn through the at least one air intake port 116, into the interior volume 105 of the container 102 and across the one or more thermal energy storage components 121. The air continues to flow, passing through an intake opening 123 at a second end of the elongate air manifold 124, through the elongate air manifold 124, the ambient air being converted to thermally modified air via convection with the one or more thermal energy storage components 121 and the elongate air manifold 124. The thermally modified air then continues through an air funnel 127 opening, into the air inlet 122, and out through the return port 118 as return air having a different temperature from the ambient air drawn through the at least one air intake port 116. As would be appreciated by one skilled in the art, the elongate air manifold 124 is sufficiently long such that the temperature of the air traversing therethrough will be modified.

In accordance with an example embodiment of the present invention, the air inlet 122 is coupled to the elongate air manifold 124 positioned underneath the fan and extending into the interior volume 105 of the container 102. The air manifold 124 has an air funnel 127 opening at a first end and the intake opening 123 at a second end, the air funnel 127 opening fluidly coupled with the air inlet 122 and the intake opening 123 fluidly coupled with the interior volume 105 of the container 102, as depicted in FIG. 1. As would be appreciated by one skilled in the art, the air manifold 124 can have a variety of designs for facilitating the flow of air into and out of the interior volume 105 of the container 102 via the air inlet 122. For example, the air manifold 124 can have one central channel fluidly coupling an air funnel 127 at the first end with the intake opening at the second end or the air manifold 124 can have a plurality of channels fluidly coupling an air funnel 127 at the first end with the intake opening at the second end. Similarly, the ratio of length to width of the elongate air manifold 124 can vary based on a size and dimension of the container 102 and the interior volume 105 of the container 102. For example, the elongate air manifold 124 length to width ratio can be greater than 10% of the fan diameter.

Additionally, the air manifold 124 can also have a plurality of side wall openings for enabling distribution of airflow throughout the interior volume 105 of the container 102. In accordance with an example embodiment of the present invention, the air manifold 124 includes a plurality of thermally conductive surface features. For example, the air manifold 124 includes one or more of fins, contours, finger projections, or combinations thereof, as would be readily understood by those of skill in the art based on the present disclosure, which increase a thermally conductive surface area of the air manifold 124 relative to a and smooth and linear surface.

The air manifold 124 is elongate such that it has a length greater than the width of the fan that it feeds with air.

In accordance with an example embodiment of the present invention, the air manifold 124 includes attachment means for engaging the air manifold 124 with the one or more thermal energy storage components disposed inside the container 102. For example, the air manifold 124 can include attachment means in the form of posts, slots, ribs, or cups disposed along an outer surface of the air manifold 124 for attachment of the thermal energy storage components 121 to the air manifold 124 (and/or for attachment to the container 102). The thermal energy storage components 121 can include any temperature modifying substances capable of changing a temperature of airflow. Examples of thermal energy storage components 121 include but are not limited to hand warmer pouches of iron oxide crystals, ice cubes, freezable or heatable blocks, chemically activated gel packs, rechargeable battery packs, or freezable gel pouches. Additionally, the air manifold 124 can have a tapered end configuration with a narrower end of the tapered configuration being proximate the intake opening 123 at the second end in such a way that the tapered configuration is an ice deflector when the container 102 is filled with temperature modifying substances (e.g., ice cubes, crushed ice, shaved ice, etc.) such that the elongate air manifold 124 pushes aside the temperature modifying substances as the lid 110 is coupled with the container 102. In particular, the air manifold 124 is sized, shaped, and tapered to prevent the lid 110 and air manifold 124 from becoming wedged or locked by contents (e.g., temperature modification substances such as ice) included within the interior volume 105 of the container 102. More specifically, the tapered shape allows for the lid 110 (with the air manifold 124 attached thereto) to be forcibly removed by displacing any contents (e.g., ice cubes) in the container 102 without getting lodged between those contents. Additionally, the shape of the air manifold 124 can vary without departing from the scope of the present invention. For example, the air manifold 124 can be round, square, triangle, pentagon, spiral, hexagon, octagonal shaped or corrugated.

The combination of the at least one air intake port 116, the fan 120, the air inlet 122, the air manifold 124, and the return port 118 enable the device 100 to draw in ambient air from the external environment 111 and circulate the air through the interior volume 105 of the container 102 before being exhausted through the return port 118. The addition of temperature modifying substances and/or thermal generating containers or materials will cause the ambient air drawing in through the at least one air intake port 116 to be modified while in the interior volume 105 of the container 102 such that the return air (exhaust through the return port 118) will have a different temperature from the ambient air drawn. As would be appreciated by one skilled in the art, the temperature will vary based on the temperature of the interior volume 105 and the temperature modifying substances and/or the thermal energy storage components 121 within the container. For example, the materials can produce and exhaust an air flow temperature difference of at least 2 degrees Fahrenheit from the original ambient air temperature in the external environment 111. Similarly, the air flow temperature change will vary depending on proximity of a user to the return port 118 of the lid 110. For example, if a user is within 2" inches or 5 cm to 6" inches or 15 cm from the return port 118 opening to the user may experience a temperature difference between the ambient environment and the air return of about 2 degrees Fahrenheit.

Figure 2D:
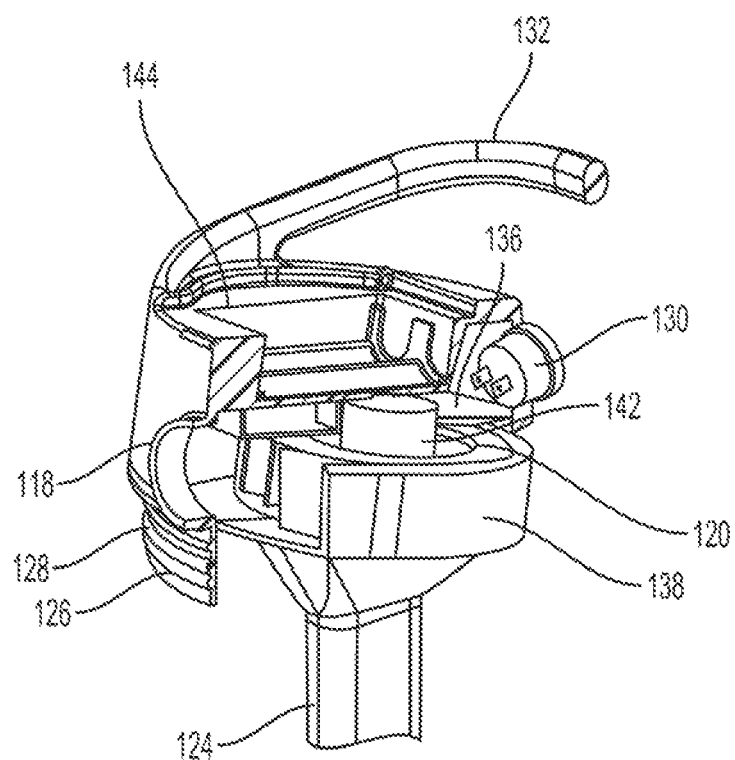
Figure 2E:
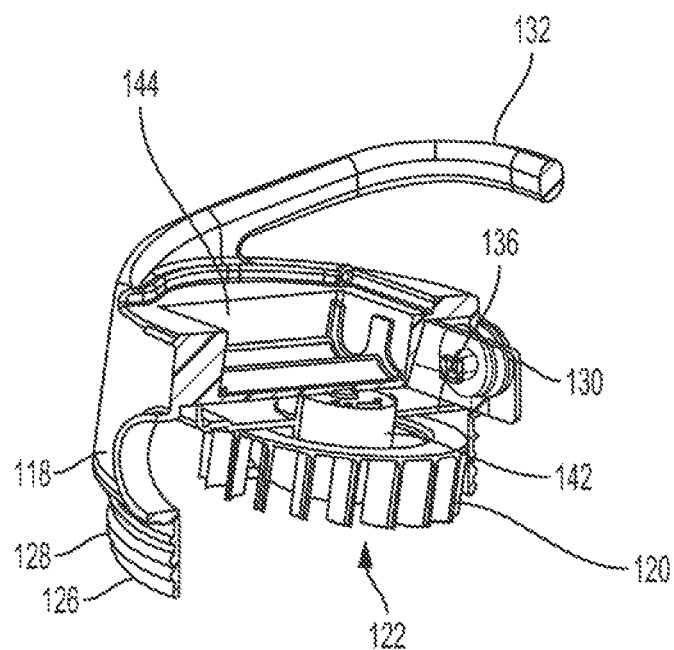

FIGS. 2A-2E depict more detailed views of the lid 110 and air manifold 124. In particular, FIG. 2A is a side view and FIGS. 2B-2C are side cross-sectional views of the lid 110 with the air manifold attached thereto. FIGS. 2D and 2E depict cut-away perspective views of the lid 110.

As discussed with respect to FIG. 1 and depicted in FIGS. 2A-2E, the lid 110 is designed for removable attachment to the opening 106 of the container 102. As would be appreciated by one skilled in the art, the lid 110 can include any combination of mechanical coupling means for removably attaching the lid 110 to the container 102. For example, the lid 110 can include a mechanical coupling means, such as a threaded coupling 126, or one of a friction or interference fit, a latch mechanism, or a magnetic coupling. In accordance with an example embodiment of the present invention, the lid 110 also includes a gasket seal 128 disposed about the lid 110 that is configured to engage with the container 102 opening 106 when the lid 110 is in a sealed position on the container 102. The gasket seal 128 can include an elastomer gasket seal, a rubber ribbed gasket, an O-ring, or any other gasket seal known in the art. In addition to creating an air tight seal between the lid 110 and the container 102, the gasket seal 128 also provides vibration dampening, noise reduction, and thermal preservation between the container 102 opening 106 and the lid 110. In particular, the gasket seal 128 provides a vibration absorption perimeter disposed along the entire perimeter of the lid 110, and is sized and dimensioned to form a friction fit with the interior side of the one or more walls of the container 102 and seal the opening 106 of the container 102 when the lid 110 is inserted into the opening 106.

The lid 110 is configured to house the components for controlling the airflow from the external environment 111 into and through the interior volume 105 of the container 102 and exhausting the air out through the return port 118. FIG. 2A depicts the external components of the lid 110 housing. The external components of the lid 110 housing include the at least one air intake port 116, the return port 118, a power button 130 for operation of the fan 120, and a handle 132. Additionally, the lid 110 is removably or fixedly attached to the air inlet 122 and the air manifold 124. Further, the lid 110 can include an internal battery compartment or an externally connected battery compartment for supplying power to the fan motor 142. It can also include a rechargeable battery cord plug or direct current power cord plug outlet, a battery indicator, or fan speed indicator. The battery compartment can be weather resistant and include a hinge with a clip, screw, or other mechanical fastener to contain the batteries even during device impact such as if it were dropped on a floor.

As discussed with respect to FIG. 1, the at least one air intake port 116 is the location where ambient air from the external environment 111 is pulled into the device 100 (e.g., via the fan 120). In accordance with an example embodiment of the present invention, the at least one air intake port 116 includes one or more internally mounted or externally located movable doors (not depicted) positioned and configured to close or open access to the at least one air intake port. The one or more movable doors can be closed to block the at least one air intake port 116 or opened to provide access to the at least one air intake port 116 in such a way that the door(s) can be closed when the fan 120 is not activated, thereby preserving thermal energy within the container 102. As would be appreciated by one skilled in the art, the one or more movable door(s) can also be partially opened/closed to manually control the airflow.

In accordance with an example embodiment of the present invention, the lid 110 can include one or more insulating temperature preservation and sound insulating foam inserts to fill the empty space around and under the assembled fan lid 110. The one or more insulating foam insets 190 can be utilized in place of or in addition to the one or more movable doors for the at least one air intake port 116. The one or more insulating foam inserts can partially block the at least one air intake port 116 (e.g., one or more vents creating the at least one air intake port 116) to statically control the amount of airflow needed for the device 100 to operate efficiently while preserving the inside temperature of the container 102. By partially covering portions of the at least one air intake port 116 the insulating foam inserts reduce an amount of ambient temperature air inadvertently impacting a temperature of the interior volume 105 of the container 102.

Continuing with FIG. 2A, the lid 110 includes or is otherwise attached to the air inlet 122 and the air manifold 124. The air inlet 122 and the air manifold 124 can be permanently fixed or friction paired for easy attachment to the fan lid 110 housing opening or sealable fixed and mated to the lid 110 by means of a compression fitting elastomeric gasket. As discussed with respect to FIG. 1, the air inlet 122 and the air manifold 124 are configured to provide a centralized contained air flow channel for circulating airflow (e.g., from the at least one air intake port 116) through the interior volume 105 of the container.

Figure 3A:
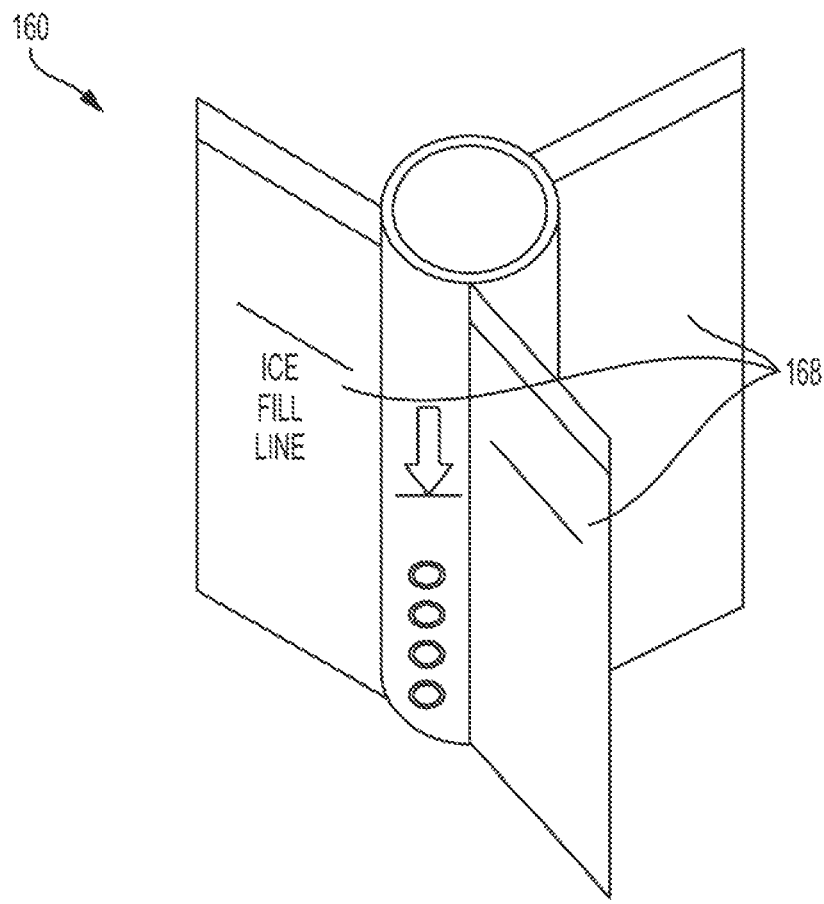
FIGS. 3A, 3B, and 3C depict a multi-channel directional airflow manager as an alternative to the air manifold.
Figure 3B:
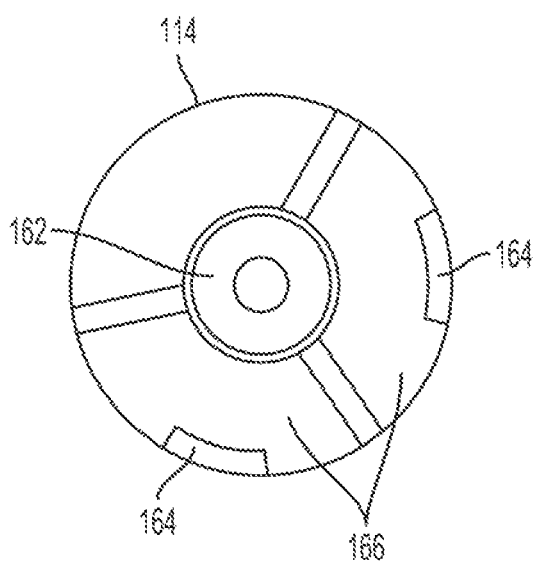
Figure 3C:
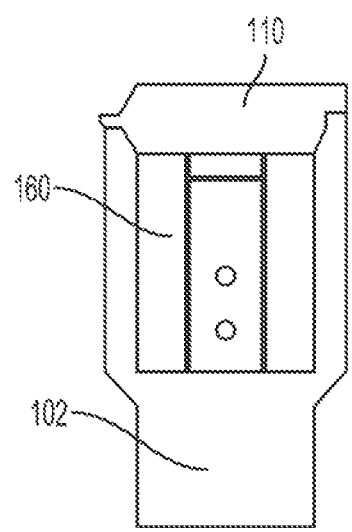

In accordance with an alternative example embodiment of the present invention, the air manifold 124 can be replaced with a multi-channel directional airflow manager 160. FIGS. 3A-3B depict example embodiments of the multi-channel directional airflow manager 160 for installation/placement within the interior volume 105 of the container. In particular, FIG. 3A depicts a view of the multi-channel directional airflow manager 160 without being implemented within the container 102, FIG. 3B depicts a top view of the multi-channel directional airflow manager 160 installed within the container, and FIG. 3C depicts a side view perspective of the multi-channel directional airflow manager 160 installed within the container.

In accordance with an example embodiment of the present invention, the multi-channel directional airflow manager 160 includes a plurality of fins 168 and a central air channel 162 surrounded by a plurality of storage chambers 166 (created by the fins 168) configured to store thermal energy storage components 121. The multi-channel directional airflow manager 160 also includes a plurality of airflow channels 164 fluidly coupling the plurality of storage chambers 166 with the central air channel 162 proximal the base 108 of the container 102. The multi-channel directional airflow manager 160 is configured to direct airflow in such a way that when the fan 120 is operating, supply air flows in to the interior volume 105 of the container 102 through the at least one air intake port 116, through the plurality of airflow channels 164 (adjacent to the plurality of storage chambers 166 and receiving conductive heating or cooling energy from the plurality of storage chambers 166 (via the thermal energy storage components 121) into the plurality of airflow channels 164), through the central air channel 162, and out as a modified air flow through the return port 118. As would be appreciated by one skilled in the art, the multi-channel directional airflow manager 160 can be a fixed portion of the container 102 or the multi-channel directional airflow manager 160 can be a removable element inserted into any compatible container 102.

The plurality of storage chambers 166 are configured to store thermal energy storage components 121 having a temperature greater than ambient air temperature in the external environment 111 of the device 100 and/or cooling elements having a temperature lesser than ambient air temperature in the external environment 111. In accordance with an example embodiment of the present invention, the thermal energy storage components 121 can be made to fit around the central air channel 162 and/or the plurality of airflow channels 164 within the container 102 Accordingly, when the thermal energy storage components 121 are placed inside the plurality of storage chambers 166 inside the container 102 with the lid 110 in the sealed position, thermal energy transfers via conduction from the storage chambers 166 through to the airflow channels 164, and the plurality of airflow channels 164 direct the supply air through the central air channel 162 to the fan 120 coupled with the lid 110. As would be appreciated by one skilled in the art, the thermal energy storage components 121 cool or heat the airflow through heat transfer.

In accordance with an example embodiment of the present invention, the multi-channel directional airflow manager 160 itself can include and provide a thermal energy source (e.g., hot or cold generating elements). In particular, the structure and/or the walls of the multi-channel directional airflow manager 160 can contain the thermal energy storage components 121. For example, the multi-channel directional airflow manager 160 can be constructed from a re-freezable ice pack or equivalent heat pack (e.g., thermal battery heat pack) shaped to form the central air channel 162, the plurality of airflow channels 164, and optionally the plurality of storage chambers 166 configured to store heating or cooling elements. As would be appreciated by one skilled in the art, the multi-channel directional airflow manager 160 as the thermal energy storage components 121 can provide all of the thermal energy for the device 100 or can be utilized in combination with additional thermal energy sources stored in the plurality of storage chambers 166.

In accordance with an example embodiment of the present invention, the lid 110 includes a handle 132 extending therefrom. The handle 132 can be a molded handle 131a is coupled to the lid 110, as depicted in FIGS. 1 and 2A-2E or the handle 132 can be removably attached to the lid 110 and configured to pivot about the coupling point with the lid 110. For the removable handle 132, the lid 110 can include cutouts in which an end of the handle 132 can be inserted to form a friction fit and rotate freely. This way the user can attach various length handles as needed. Regardless of implementation, the handle 132 is configured to enable a user to carry and hold the device 100 during use. The handle 132 also allows a user to place the device 100 horizontally onto a flat surface and prevent the device 100 from unintentional rolling. Additionally, the handle 132 is sized, shaped, and oriented to support a mobile phone or mobile tablet device at a desired viewing angle for display, prevent accidental on/off switch activation, and/or block accidental power cord dislodgment when connected to an external power source.

Continuing with FIG. 2A, the fan 120 power state is controlled by the switch/button 130. In accordance with an example embodiment of the present invention, the fan 120 is a variable speed fan and the button 130 is a variable speed fan control. Additionally, the button 130 can include variable fan speed graphics including on/off positions (e.g., after low is off, and low through higher is on). As would be appreciated by one skilled in the art, any combination of buttons can be utilized for the button 130 without departing from the scope of the present invention. For example, the button can be a digital switch, an analog switch, a haptic feedback switch, or a combination thereof.

FIG. 2B depicts some of the internal components of the lid 110 through the cross sectional perspective. In particular, in addition to the components discussed with respect to FIG. 2A, FIG. 2B and FIG. 2C depict a motor housing 136, a fan housing 138, and a battery door cover 140. In accordance with an example embodiment of the present invention, the motor housing 136, the fan housing 138, and the battery door cover 140 form a network of closed compartments including battery storage compartment 144, button 130, motor housing 136, fan housing 138 and other closed compartments 192, configured to prevent ambient temperature air water condensation and modified temperature air water condensation from contact with the connected electrical components located within such compartments. For example, the network of closed compartments contain and protect the one or more electrically connected switches, printed circuit boards (PCBs), light emitting diodes (LEDs) 194, and batteries. As would be appreciated by one skilled in the art, the motor housing 136 and a fan housing 138 can be constructed from any materials known in the art and are designed to safely house a motor 142, the electrical components, and the fan 120 components. Additionally, the protection can be provided through any combination of methods and systems known in the art. For example, protection from ambient temperature air, water condensation, etc. can be provided by a combination of seals containers and insulation materials. The fan housing 138 includes an opening adjacent to the at least one air intake port 116 to allow air from the external environment 111 to be pulled into the fan housing 138 and the air inlet 122. In accordance with an example embodiment of the present invention, the fan housing 138 includes one or more fins in the opening to control the flow of air and prevent large debris from being pulled into the fan housing 138. The fan housing 138 also includes a hinged battery door cover 140 and a snap latch that locks over into a locked of closed position.

Continuing with FIG. 2B, the battery door cover 140 is a cover protecting a battery storage compartment 144 for housing and facilitating power transfer from a power source to the motor 142, discussed in greater detail with respect to FIG. 2C. The battery door cover 140 is configured to provide access to and protect the battery storage compartment 144 and the contents thereof (e.g., batteries). For access purposes, the battery door cover 140 can include any combination of mechanical door covers known in the art. For example, the battery door cover 140 can be a hinged door, a removable battery cover (e.g., secured by a screw or other locking mechanism), or other door cover known in the art. When closed and secured (e.g., via screw or other locking mechanism), the battery door cover 140 provides a weather resistant, waterproof, dust resistant seal for the battery storage compartment 144. In accordance with an example embodiment of the present invention, the battery door cover 140 is equipped for magnetic power cord attachment for plug-free, wireless re-chargeable battery charging, or other power transfer mechanism to convey power to/from a power source within the battery storage compartment 144 without having to open the battery door cover 140. Additionally, the battery door cover 140 can have a raised or protruding holding tab to place a cell phone or tablet screen face up for viewing on top of the lid 110 handle 132 and battery cover holding tab. The lid handle 132 engages the cell phone screen or tablet screen at a desired viewing angle and is held in position by the battery cover tab.

FIG. 2C depicts some of the internal components of the lid 110 (e.g., components within the motor housing and the fan housing 138) through the cross sectional perspective. In particular, in addition to the components discussed with respect to FIGS. 2A and 2B, FIG. 2C depicts the fan motor 142, the fan 120, and the battery storage compartment 144 accessible via the battery door cover 140. The fan motor 142 controls the rotation of the fan 120 and is powered by the power source located within the battery storage compartment 144. The power source can include any combination of fixedly attached storage (e.g., power cell, fixed rechargeable battery, etc.) and/or replaceable power sources (e.g., batteries, rechargeable batteries, etc.). As would be appreciated by one skilled in the art, the device 100 can be powered by any combination of disposable or rechargeable batteries (e.g., AA, AAA, D, etc.), lithium battery, alternating current (AC) micro universal serial bus (USB) power cable, solar energy sources, etc. Additionally, the power source can be recharged and/or provide energy to other devices (e.g., smartphone) through a wireless or wired connection to a charger (e.g., via wireless charging, USB, micro-USB, multi-pin dock connector, and lighting power connector, etc.). The battery storage compartment 144 houses the power source and electronically connects the power source to the motor 142. Additionally, the button 130 is connected to both the power source and the motor 142 and controls the power output to the motor 142.

FIGS. 2D and 2E depict cross-sectional views of the lid 110 and components included therein. In particular, FIGS. 2D and 2E depict alternate views of the components discussed with respect to FIGS. 2A-2C. The three-quarter perspective shows how the motor 142, fan 120, the fan housing 138, the air inlet 122, the air manifold 124, and other components relate to one another. Additionally, FIG. 2E depicts the multiple curved fan blade design of the fan 120. Additionally, the lid 110 and components included therein are weather resistant to protect the internal mechanical and electrical operation of the components.

In accordance with an example embodiment of the present invention, the lid 110 can include other electronic components stored within the housings 136, 138, 144 and powered/controlled by the power source and button 130. The electronic components can include a printed circuit board or equivalent for a light emitting diode(s) (LED(s)) incorporated within the lid 110 (e.g., on top the top surface of the lid 110) to indicate to a user, the power status of the device 100 (or present other alerts/notifications). As would be appreciated by one skilled in the art, the LED indicator(s) can be viewable from any interior or exterior surface of the lid 110 and is not limited to a top surface of the lid 110. In an example, with an LED(s) on the interior of the lid 110, light can be provided through the air return port 118 (or an extension delivery tube 150). Similarly, the LED(s) can provide light for viewing the interior volume 105 of the container 102 or be used as a night light. The LED(s) can provide other feedback to a user including but not limited to an on/off status, a battery level, a fan speed, etc. Additionally, in accordance with an example embodiment, the lid 110 can include an internal temperature sensor connected to the LED. The internal temperature sensor can be configured to read an internal air temperature within the interior volume 105 of the container and update the LED based on the measure temperature. For example, indicate a LED color of white, green, blue for cooler temperatures and yellow, red, orange for warmer temperatures.

The electronic components can also include a wireless communication component configured to wirelessly communicate using one or more of radio frequency (RF), Wi-Fi®, cellular, Bluetooth®, Bluetooth Low Energy®, personal area network (PAN), short-wavelength UHF, or combinations thereof. The wireless communication component can be coupled with a control mechanism that is controlling the fan 120 operation in such a way that the fan 120 is controllable by separate device (e.g., smartphone) in wireless communication with the control mechanism via the wireless communication component. The electronic components can further include a microphone configured receive voice commands translated to commands for a control mechanism controlling operation of the fan 120. As would be appreciated by one skilled in the art, the lid 110 can include any combination of electronic components found in electrically controlled portable devices.

In accordance with an example embodiment of the present invention, the device is configured to be compatible with a number of different accessory and optional features (not depicted). Some optional accessories and features include but are not limited to a removable insulating jacket cover sized, dimensioned, and configured to fit around the container 102, a temperature sensor, and corresponding temperature display, disposed on the device 100 for sensing air temperature, an ultrasonic electronic water mist generator for supplying water mist to the return port 118, an aromatic diffuser for supplying aroma to the return port 118, a liquid medication diffusor for supplying air flow medication out through the return port 118, a water mist generator coupled with a water source, a washable and reusable air filter and an air filter coupled with the return port 118, to an attachable delivery tube 150, or both. As would be appreciated by one skilled in the art, the filter can include any combination of a disposable air filter, carbon based filter, a HEPA air filter, etc.

Figure 4:
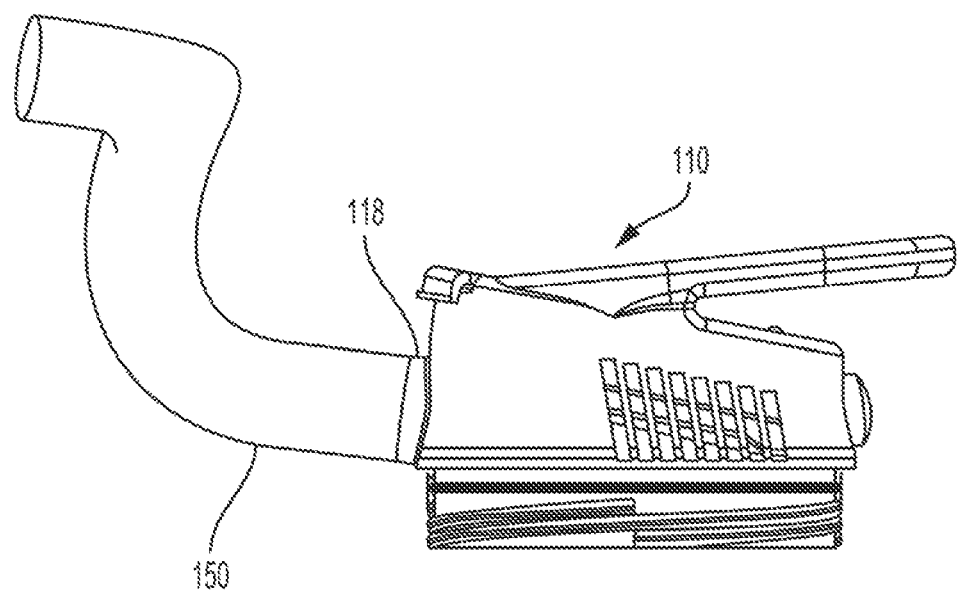
FIG. 4 is side view of the lid of FIG. 2A with an extension hose extending therefrom.

In accordance with an example embodiment of the present invention, the lid 110 is configured to couple with an extendable, multi-position flexible delivery tube 150. FIG. 4 depicts an example implementations of the lid 110 with the tube 150 attached thereto. In particular, FIG. 4 depicts tube 150 attached to the lid 110 via a friction fitting at the air return port 118 whereby the user installs the tube 150 to direct air flow remotely away from the device 100. As would be appreciated by one skilled in the art, the tube 150 can be affixed to the air return port 118 utilizing any mechanism known in the art. The tube 150 is positionable in a plurality of different directions so as to enable the user to direct airflow as desired. In accordance with one illustrative embodiment of the present invention, the positionable functionality is achieved by making the tube 150 flexible, such as for example, by constructing the tube of a rubber or plastic material, which could be corrugated. In operation, the tube 150 enables remote placement of the device 100 while providing the benefits of the device 100 to the user.

Additionally, the tube 150 can further include a mounting clip (not shown, but readily understood by those of skill in the art) configured to removably attach the tube 150 at a desired location to directionally control blowing air emitted therefrom. The combination of an air return port 118 and/or the extendable and positionable tube 150 enables the device 100 to deliver the temperature modified air flow at a distal location away from the lid 110 and container 102 assembly, resulting in a quieter, more convenient temperature modifying experience for the user. For example, the container 102, with the lid 110 in place, can be placed into a cup holder of a stroller, and when the device 100 is activated the modified temperature airflow out from the device 100 can be delivered and directed to a nearby child seated in the stroller via the extendable tube 150. As would be appreciated by one skilled in the art, the tube 150 can be provided in any combination of lengths and diameters without departing from the functionality of the present invention. For example, the tube 150 can be configured to extend in ¼" increments from approximately 6" to 28". Similarly, the tube 150 can be flexible in design and configured to hold its shape. For example, a user can extend the tube 150 around 90 degree corners without effect to airflow. The benefit of remote airflow delivery is to reduce noise and vibration, as well as obscure the motorized device from the intended benefactor.

In accordance with an example embodiment of the present invention, the lid 110 includes a fixed carry ring element (not depicted) configured for attachment to another storage or carrying device. For example, the lid 110 can include a carabiner for attachment to a backpack or other type of bag to enable hands free carrying of the device 100. As would be appreciated by one skilled in the art, the carry ring element can be positioned anywhere on the outer surface of the lid 110 that enables such an attachment.

In accordance with an example embodiment of the present invention, the overall assembled device 100 is sized, dimensioned, and configured in such a way that the device 100 is portable and removably and replaceably mounts in a conventional cup holder, such as would be found in an automobile, a stroller, a shopping cart, or the like. As would be appreciated by one skilled in the art, the device 100 can be sized, shaped, and configured in any dimensions known in the art without departing from the functionality of the present invention in terms of heating and cooling operation (but not necessarily with respect to being able to fit within a conventional cup holder). Similarly, the lid 110 can be sized, shaped, and dimensions to universally fit a variety of existing commercial available containers. Additionally, the external sides of the lid 110, including a battery door cover 140, the button 130 and any other switches, the handle 132 are constructed of less-heat absorbing materials, finishes, or colors to reduce heat absorption by the fan 120 for use in extreme ambient temperatures or sunlight.

The device 100 can be constructed utilizing any combination of manufacturing methods known in the art and can include any number of pieces coupled together or a single molded/printed device. Additionally, each of the components of the device 100 can be constructed from any combination of materials known in the art. Preferably the device 100 is constructed from light weight components to provide a lite weight portable device 100. For example, ideally, the total device 100 weighs less than 10 lbs, preferably less than 5 lbs, and more preferably less than 2 lbs.

In operation, when the lid 110 is in the sealed position on the container 102, the motorized centrifugal fan 120 is operating, and one or more thermal energy storage components are disposed in the interior volume 105 of the container 102, then ambient air is drawn through the at least one air intake port 116, into the interior volume 105 of the container 102 and across the one or more thermal energy storage components, through the intake opening (e.g., air inlet 122) at the second end of the elongate air manifold 124, through the elongate air manifold 124, the ambient air being converted to thermally modified air via convection with the one or more thermal energy storage components and the elongate air manifold 124, the thermally modified air then continuing through the air funnel 127 opening (e.g., in the fan housing 138), into the air inlet 122, and out through the return port 118 as return air having a different temperature from the ambient air drawn through the at least one air intake port 116.

In short, when activated, the device 100 of the present invention provides either a cooling air flow or a heating airflow based on a temperature of the contents with the interior volume 105 of the container 102 relative to ambient air temperature in the external environment 111. In particular, the combination of the contents of the interior volume 105 (e.g., ice, heat packs, etc.), the air manifold, and the lid 110 assembly containing the fan 120 create a heating or cooling effect by heating or cooling an ambient temperature air intake with the contents of the container 102 and transferring the thermal energy into the airflow of the air manifold 124. More specifically, transfer of thermal energy occurs when the air enters remotely from at least one air intake port 116 and flows downward or in the direction of a flow path instigated by the fan 120 generated vacuum, which air flow passes alongside the air manifold 124 within the container. The resulting modified airflow is then exhausted out through the return port 118 toward a user.

Figure 5:
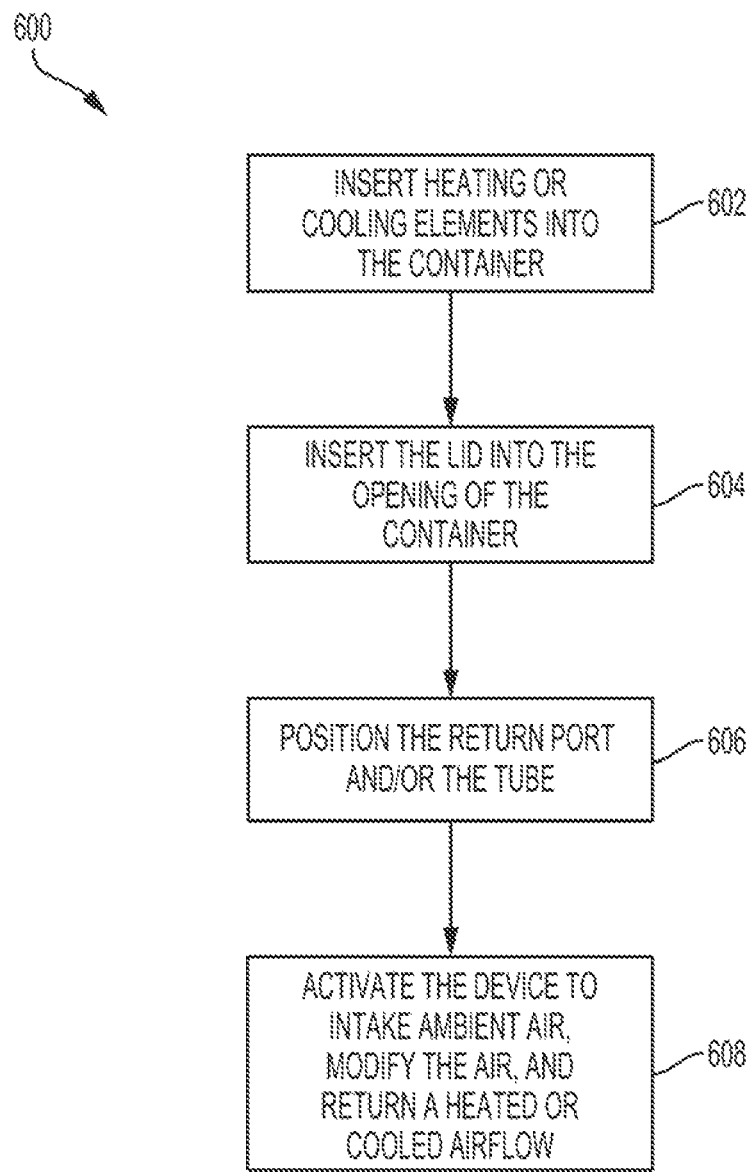
FIG. 5 an illustrative flowchart depicting the method of use of the device.

FIG. 5 shows an exemplary flowchart depicting operation of the present invention. Specifically, FIG. 5 depicts an exemplary flowchart showing the process 600 for carrying out the operation of the device 100 to provide cooling or heating to a user. At step 602, the user inserts the heating or cooling elements (e.g., the thermal energy storage components 121) into the interior volume 105 within the container 102 (and attached to the air manifold 124). At step 602, the user inserts the lid 110 into the opening 106 of the container 102. The lid 110 is sealed, by the vibration absorption perimeter gasket seal 128, within the opening 106 of the container 102. At step 606, the user directs the positioning of the return port 118 and/or the tube 150 in the direction that the modified airflow is desired. Step 606 can also include attaching the optional the tube 150 to the return port 118 of the lid 110.

At step 608, the user activates the device 100 and the device 100 produces the modified airflow output from the ambient temperature air intake (e.g., turning on the variable speed fan control 130). In accordance with an example embodiment of the present invention, during operation, the user can modify the fan speed by adjusting the variable speed fan control 130. The importance of the fan speed is that when the device 100 is used with different materials providing thermal energy sources (e.g., ice, ice packs, cold water, iron oxide, gel pack, battery generator heat pack) the fan speed can be tailored to provide the most beneficial temperature difference out from the container 102. For example, higher fan speeds can cause the ambient air to pass more quickly through the device 100 and therefore have less opportunity to absorb thermal energy (resulting in cooler warm air flow if attempting to heat, or warmer cool air flow if attempting to cool as it exits through the return port 118). Likewise, lower fan speeds may be more desirable for ambient air temperature modification when used for small children and or pets. Lower fan speeds can also cause less vibration and less collateral noise generation.

Continuing with step 608, operation of the device 100 includes an intake of ambient temperature air through the at least one air intake port 116. Forcing the flow of air down through the air manifold 124 via the air inlet 122. While the ambient temperature air is forced through the air manifold 124, the ambient temperature air is exposed to multiple temperature modifying surfaces adjacent to the air manifold 124 prior to being drawn into a type fan housing 138 and out toward a localized area user through the return port 118 (and optionally through the tube 150 coupled with the return port 118), thereby supplying temperature-modified air to the user.

As utilized herein, the terms "comprises" and "comprising" are intended to be construed as being inclusive, not exclusive. As utilized herein, the terms "exemplary", "example", and "illustrative", are intended to mean "serving as an example, instance, or illustration" and should not be construed as indicating, or not indicating, a preferred or advantageous configuration relative to other configurations. As utilized herein, the terms "about", "generally", and "approximately" are intended to cover variations that may existing in the upper and lower limits of the ranges of subjective or objective values, such as variations in properties, parameters, sizes, and dimensions. In one non-limiting example, the terms "about", "generally", and "approximately" mean at, or plus 10 percent or less, or minus 10 percent or less. In one non-limiting example, the terms "about", "generally", and "approximately" mean sufficiently close to be deemed by one of skill in the art in the relevant field to be included. As utilized herein, the term "substantially" refers to the complete or nearly complete extend or degree of an action, characteristic, property, state, structure, item, or result, as would be appreciated by one of skill in the art. For example, an object that is "substantially" circular would mean that the object is either completely a circle to mathematically determinable limits, or nearly a circle as would be recognized or understood by one of skill in the art. The exact allowable degree of deviation from absolute completeness may in some instances depend on the specific context. However, in general, the nearness of completion will be so as to have the same overall result as if absolute and total completion were achieved or obtained. The use of "substantially" is equally applicable when utilized in a negative connotation to refer to the complete or near complete lack of an action, characteristic, property, state, structure, item, or result, as would be appreciated by one of skill in the art.

Numerous modifications and alternative embodiments of the present invention will be apparent to those skilled in the art in view of the foregoing description. Accordingly, this description is to be construed as illustrative only and is for the purpose of teaching those skilled in the art the best mode for carrying out the present invention. Details of the structure may vary substantially without departing from the spirit of the present invention, and exclusive use of all modifications that come within the scope of the appended claims is reserved. Within this specification embodiments have been described in a way which enables a clear and concise specification to be written, but it is intended and will be appreciated that embodiments may be variously combined or separated without parting from the invention. It is intended that the present invention be limited only to the extent required by the appended claims and the applicable rules of law.

It is also to be understood that the following claims are to cover all generic and specific features of the invention described herein, and all statements of the scope of the invention which, as a matter of language, might be said to fall therebetween.

What is claimed is:

1. A personal ambient air temperature modification device, comprising:
   a container comprising:
      one or more thermally insulated walls defining an interior volume, each of the one or more thermally insulated walls having an interior side facing the interior volume and an exterior side opposite the interior side;

an opening disposed through a first end of the container; and
a base disposed at a second end of the container opposite the first end, the base having an interior side facing the interior volume and an exterior side opposite the interior side;
wherein the container is sized, dimensioned, and configured to be portable by hand and to fit in and removably and replaceably mount in an automobile cup holder;
a lid with an interior side facing the interior volume and an exterior side opposite the interior side, the lid removably and replaceably covering the opening in such a way that obstructs the opening when in a sealed position and exposes the opening when removed from the container, the lid comprising:
a return port;
an air inlet; and
a motorized air movement mechanism disposed inside the lid at the air inlet that draws air from the air inlet and exhausts return air through the return port to an external environment external to the container and the lid;
at least one air intake port in fluid communication with the interior volume of the container, the at least one air intake port positioned to draw supply air from an ambient environment external to the device to flow into the interior volume of the container;
a thermal energy concentrator disposed in the interior volume of the container, the thermal energy concentrator comprising:
an air manifold having an air funnel opening at a first end and an intake opening at a second end, the air funnel opening fluidly coupled with the air inlet and the intake opening fluidly coupled with the interior volume of the container;
wherein when the lid is in the sealed position on the container, the motorized air movement mechanism is operating, and one or more thermal energy storage components are disposed in the interior volume of the container, then ambient air is drawn through the at least one air intake port, into the interior volume of the container and across the one or more thermal energy storage components, through the intake opening at the second end of the air manifold, through the air manifold, the ambient air being converted to thermally modified air via convection with the one or more thermal energy storage components and the air manifold, the thermally modified air then continuing through the air funnel opening, into the air inlet, and out through the return port as return air having a different temperature from the ambient air drawn through the at least one air intake port.

2. The personal ambient air temperature modification device of claim 1, further comprising the return air having a different temperature from the ambient air drawn through the at least one air intake port, wherein the different temperature is a temperature difference of at least 2 degrees Fahrenheit.

3. The personal ambient air temperature modification device of claim 1, wherein the container has a double wall configuration with an air gap disposed between walls of the double wall configuration.

4. The personal ambient air temperature modification device of claim 1, wherein the container has a double wall configuration with one or more thermally insulating materials disposed between walls of the double wall configuration.

5. The personal ambient air temperature modification device of claim 1, wherein the interior volume of the container is one of about 10 oz, about 15 oz, about 20 oz, about 24 oz, about 30 oz, about 36 oz, about 40 oz, about 45 oz, about 50 oz, about 55 oz, or about 60 oz.

6. The personal ambient air temperature modification device of claim 1, wherein the container is manufactured of one or more of a plastic, composite, metal, rubber, elastomeric material, non-elastomeric material, or combinations thereof.

7. The personal ambient air temperature modification device of claim 1, further comprising a gasket seal disposed about the lid and configured to engage with the container opening when the lid is in a sealed position on the container.

8. The personal ambient air temperature modification device of claim 1, further comprising an elastomer gasket seal disposed about the lid and configured to engage with the container opening when the lid is in a sealed position on the container, the elastomer gasket seal providing vibration dampening, noise reduction, and thermal preservation between the container opening and the lid.

9. The personal ambient air temperature modification device of claim 1, further comprising a mechanical coupling between the lid and the container, the mechanical coupling comprising at least one member selected from the group consisting of a friction or interference fit, a latch mechanism, a threaded coupling, and combinations thereof.

10. The personal ambient air temperature modification device of claim 1, further comprising a thermally insulating insert disposed in the lid proximate the interior side facing the interior volume.

11. The personal ambient air temperature modification device of claim 10, wherein the thermally insulating insert comprises a non-toxic insulating plastic foam insert, an insulating composite material, or combinations thereof.

12. The personal ambient air temperature modification device of claim 10, wherein the thermally insulating insert is vibration-dampening, sound dampening, or both.

13. The personal ambient air temperature modification device of claim 10, wherein the thermally insulating insert further comprises one or more air intake channels providing fluid communication between the at least one air intake port and the interior volume of the container when the lid is in the sealed position on the container.

14. The personal ambient air temperature modification device of claim 10, wherein the thermally insulating insert is removable, washable, and reusable.

15. The personal ambient air temperature modification device of claim 1, wherein the motorized air movement mechanism comprises a centrifugal fan having curved fan blades, flat fan blades, or combinations thereof.

16. The personal ambient air temperature modification device of claim 1, wherein the thermal energy concentrator is comprised of a porous material or a non-porous material.

17. The personal ambient air temperature modification device of claim 1, wherein the thermal energy concentrator comprises a plurality of perforations throughout its length.

18. The personal ambient air temperature modification device of claim 1, wherein the air manifold has one central channel fluidly coupling the air funnel at the first end with the intake opening at the second end.

19. The personal ambient air temperature modification device of claim 1, wherein the air manifold is elongate and has a plurality of channels fluidly coupling the air funnel at the first end with the intake opening at the second end.

20. The personal ambient air temperature modification device of claim 1, wherein the air manifold is elongate and has a plurality of side wall openings.

21. The personal ambient air temperature modification device of claim 1, wherein the air manifold has a plurality of thermally conductive surface features.

22. The personal ambient air temperature modification device of claim 1, wherein the air manifold has a plurality of thermally conductive surface features comprising one or more of fins, contours, finger projections, or combinations thereof, which increase a thermally conductive surface area of the air manifold relative to a smooth and linear surface.

23. The personal ambient air temperature modification device of claim 1, wherein the air manifold is elongate and has a tapered configuration with a narrower end of the tapered configuration being proximate the intake opening at the second end in such a way that the tapered configuration is an ice deflector when the container is filled with ice cubes, crushed ice, and/or shaved ice, such that the air manifold pushes aside the ice as the lid is coupled with the container.

24. The personal ambient air temperature modification device of claim 1, wherein the air manifold further comprises attachment means selected from the group consisting of posts, slots, ribs, and cups disposed along an outer surface of the air manifold for engaging with the one or more thermal energy storage components disposed inside the container.

25. The personal ambient air temperature modification device of claim 1, further comprising a return air delivery tube removably and replaceably coupled with the return port.

26. The personal ambient air temperature modification device of claim 1, wherein the thermal energy concentrator is removably and replaceably coupled with the lid.

27. The personal ambient air temperature modification device of claim 1, wherein the thermal energy concentrator is permanently coupled with the lid.

28. The personal ambient air temperature modification device of claim 1, wherein the thermal energy concentrator is removably and replaceably coupled with the lid via a friction or interference fit, a latch mechanism, or a threaded coupling.

29. The personal ambient air temperature modification device of claim 1, wherein the thermal energy concentrator is adapted to receive thermal energy from one or more thermal energy storage components disposed in the interior volume of the container.

30. The personal ambient air temperature modification device of claim 1, wherein the thermal energy concentrator is adapted to receive thermal energy from one or more thermal energy storage components disposed in the interior volume of the container, the one or more thermal energy storage components comprising a warm or cold gel pack, iron oxide pouches for generating heat, ice, or combinations thereof.

31. The personal ambient air temperature modification device of claim 1, wherein the thermal energy concentrator is adapted to receive thermal energy from one or more thermal energy storage components that are folded.

32. The personal ambient air temperature modification device of claim 1, further comprising a battery storage chamber.

33. The personal ambient air temperature modification device of claim 1, further comprising a rechargeable battery storage disposed in the device.

34. The personal ambient air temperature modification device of claim 1, further comprising a wireless communication component coupled with a switch that is controlling motorized air movement mechanism operation in such a way that the motorized air movement mechanism is controllable by a separate device in wireless communication with the switch via the wireless communication component.

35. The personal ambient air temperature modification device of claim 1, further comprising a wireless communication component configured to wirelessly communicate using one or more of radio frequency (RF), wireless communication protocols, cellular, personal area network (PAN), short-wavelength ultra high frequency (UHF), or combinations thereof.

36. The personal ambient air temperature modification device of claim 1, further comprising a battery cover door having a magnetic power cord receiver coupling equipped for magnetic power cord attachment for battery charging.

37. The personal ambient air temperature modification device of claim 1, further comprising a weather resistant, or waterproof, battery cover door when in a sealed and closed position on the lid.

38. The personal ambient air temperature modification device of claim 1, wherein external sides of the lid, including a battery cover door, one or more weather resistant switches, protruding rib elements and one or more handles are constructed of materials, finishes, or colors to reduce heat absorption by the lid in sunlight.

39. The personal ambient air temperature modification device of claim 1, further comprising one or more movable doors positioned and configured to close or open access to the at least one air intake port, for maintaining thermal energy stored inside the container by closing the one or more movable doors.

40. The personal ambient air temperature modification device of claim 1, further comprising a microphone configured to receive voice commands translated to commands for a switch controlling operation of the motorized air movement mechanism.

41. The personal ambient air temperature modification device of claim 1, wherein the personal ambient air temperature modification device weighs less than 2 lbs.

42. The personal ambient air temperature modification device of claim 1, further comprising a weather resistant on/off switch for controlling the operation of the motorized air movement mechanism.

43. The personal ambient air temperature modification device of claim 1, further comprising one or more selected from the group consisting of weather resistant on/off switches, variable speed switches, one or more weather resistant switches with LED indicator, one or more timer configured to control on/off operation of the motorized air movement mechanism, and combinations thereof.

44. The personal ambient air temperature modification device of claim 1, further comprising a power receiver port selected from the group consisting of universal serial bus (USB), MICRO-USB, multi-pin dock connector, and lighting power connector.

45. The personal ambient air temperature modification device of claim 1, further comprising a solar power generation source coupled with the personal ambient air temperature modification device.

46. The personal ambient air temperature modification device of claim 1, further comprising a non-slip vibration absorption or vibration dampening base disposed on a bottom surface of the personal ambient air temperature modification device, which the device rests on a surface.

47. The personal ambient air temperature modification device of claim 1, further comprising a carry handle extending from the lid.

48. The personal ambient air temperature modification device of claim 1, further comprising a carry handle extending from the lid wherein the carry handle is configured to enable horizontal placement of the personal ambient air temperature modification device onto a flat surface without rolling.

49. The personal ambient air temperature modification device of claim 1, further comprising a carry handle extending from the lid wherein the carry handle is configured to block accidental on/off switch activation and block accidental power cord dislodgment when connected to an external power source.

50. The personal ambient air temperature modification device of claim 1, further comprising a carry handle extending from the lid, wherein the carry handle and battery cover tab are sized, dimensioned, and configured to support a mobile phone or mobile tablet device at a viewing angle on top of the tab and lid during operation of the personal ambient air temperature modification device.

51. The personal ambient air temperature modification device of claim 1, further comprising a night light.

52. The personal ambient air temperature modification device of claim 1, further comprising a removable insulating jacket cover sized, dimensioned, and configured to fit around the personal ambient air temperature modification device.

53. The personal ambient air temperature modification device of claim 1, further comprising a temperature sensor disposed on the personal ambient air temperature modification device for sensing air temperature.

54. The personal ambient air temperature modification device of claim 1, further comprising an air filter.

55. The personal ambient air temperature modification device of claim 1, further comprising an air filter coupled with the return port, to an attachable delivery tube, or both.

56. The personal ambient air temperature modification device of claim 1, further comprising a washable and reusable air filter.

57. The personal ambient air temperature modification device of claim 1, further comprising a disposable air filter.

58. The personal ambient air temperature modification device of claim 1, further comprising an air filter comprised of carbon components.

59. The personal ambient air temperature modification device of claim 1, further comprising a high-efficiency particulate absorbing (HEPA) air filter.

60. The personal ambient air temperature modification device of claim 1, wherein the personal ambient air temperature modification device is powered with rechargeable batteries, chargeable wirelessly or with a wired connection to a charger.

61. The personal ambient air temperature modification device of claim 60, wherein the rechargeable batteries are configured to charge a rechargeable battery operated device either by wire connection or by wireless charging means.

62. The personal ambient air temperature modification device of claim 1, further comprising a battery life indicator display.

63. The personal ambient air temperature modification device of claim 1, further comprising a temperature display.

64. The personal ambient air temperature modification device of claim 1, wherein the personal ambient air temperature modification device modifies ambient air temperature by at least 2 degrees Fahrenheit.

65. The personal ambient air temperature modification device of claim 1, further comprising a door that is closeable to block the at least one air intake port and openable to provide access to the at least one air intake port wherein the door is closed when the personal ambient air temperature modification device is not activated, thereby preserving thermal energy within the container.

66. The personal ambient air temperature modification device of claim 1, wherein the air manifold comprises one or more thermal energy generating device attachment means for placement within and removal from the container.

67. The personal ambient air temperature modification device of claim 1, wherein the personal ambient air temperature modification device is configured to provide localized body temperature modification of 2 degrees or greater.

68. The personal ambient air temperature modification device of claim 1, wherein the motorized air movement mechanism is structured in a turbine fan configuration of fan blades.

69. The personal ambient air temperature modification device of claim 1, wherein when the return port is placed 5 cm to 15 cm from a living thing, the device effects a topical temperature change or surface temperature effect of 2 degrees or greater.

70. The personal ambient air temperature modification device of claim 1, wherein the thermal energy concentrator comprises a multi-channel directional airflow manager with a plurality of storage chambers created by a plurality of fins.

71. The personal ambient air temperature modification device of claim 1, wherein the thermal energy concentrator comprises a multi-channel directional airflow manager comprises a plurality of airflow channels coupling a plurality of storage chambers with a central air channel.

72. The personal ambient air temperature modification device of claim 1, wherein the thermal energy concentrator comprises a multi-channel directional airflow manager in a fixed portion of the container.

73. The personal ambient air temperature modification device of claim 1, wherein the thermal energy concentrator comprises a multi-channel directional airflow manager that is removable from the container.

74. The personal ambient air temperature modification device of claim 1, wherein the thermal energy concentrator comprises a multi-channel directional airflow manager that functions as one or more thermal energy storage components.

75. The personal ambient air temperature modification device of claim 1, further comprising a wireless, battery operated wireless communication protocol enabled speaker for use during operation of the motorized air movement mechanism.

76. The personal ambient air temperature modification device of claim 1, further comprising a printed circuit board containing LEDs, battery connections, plug outlet, wireless communication protocol components within the lid.

77. The personal ambient air temperature modification device of claim 1, further comprising a motor speed indicator LED, a wireless communication connection indicator or display, and/or an on/off indicator LED.

78. The personal ambient air temperature modification device of claim 1, further comprising an illuminated power icon button that lights up when touched and turns off after a predetermined period of time.

79. The personal ambient air temperature modification device of claim 1, further comprising an LED power indicator that is illuminated when the device is on and not illuminated when the device is off.

80. The personal ambient air temperature modification device of claim 79, wherein the power indicator is a halo around an on/off switch button.

81. The personal ambient air temperature modification device of claim 1, further comprising one or more LED indicators for indicating remaining battery power or speed of the motorized air movement mechanism.

82. The personal ambient air temperature modification device of claim 1, further comprising an internal temperature sensor coupled to a temperature LED, the temperature LED illuminating cool colors for cool air temperature and warm colors for warm air temperature.

83. The personal ambient air temperature modification device of claim 1, further comprising a weather resistant soft touch coating for providing a non-slip grip when the container or the lid is wet.

84. The personal ambient air temperature modification device of claim 83, wherein the weather resistant soft touch coating is on 5% or greater of an external surface of the lid.

85. The personal ambient air temperature modification device of claim 1, wherein the container is sized to allow users with different hand sizes to handle the container.

86. The personal ambient air temperature modification device of claim 85, wherein the container further comprises a universal grip shape comprising different shape sections including at least one selected from the group consisting of geometric shapes, taper shapes, flared shapes, contoured shapes, round, square, hexagonal, and textured grip shapes.

87. The personal ambient air temperature modification device of claim 1, wherein the container has a ratio of a vibration absorption base to container width, wherein the ratio is between 80% and 150%.

88. The personal ambient air temperature modification device of claim 1, further comprising a weather resistant battery cover with hinge and clip closure with anti-vibration and temperature preservation and sound insulating properties.

89. A personal ambient air temperature modification device, comprising:
   a container comprising:
      one or more thermally insulated walls defining an interior volume, each of the one or more thermally insulated walls having an interior side facing the interior volume and an exterior side opposite the interior side;
      an opening disposed through a first end of the container; and
      a base disposed at a second end of the container opposite the first end, the base having an interior side facing the interior volume and an exterior side opposite the interior side;
   wherein the container is sized, dimensioned, and configured to be portable by hand and to fit in and removably and replaceably mount in an automobile cup holder;
   a lid with an interior side facing the interior volume and an exterior side opposite the interior side, the lid removably and replaceably covering the opening in such a way that obstructs the opening when in a sealed position and exposes the opening when removed from the container, the lid comprising:
      a return port;
      an air inlet; and
      a motorized air movement mechanism disposed inside the lid at the air inlet that draws air from the air inlet and exhausts return air through the return port to an external environment external to the container and the lid;
   at least one air intake port in fluid communication with the interior volume of the container, the at least one air intake port positioned to draw supply air from an ambient environment external to the device to flow into the interior volume of the container;
   a thermal energy concentrator disposed in the interior volume of the container, the thermal energy concentrator comprising:
      a multi-channel directional airflow manager having a central air channel that is coupled with the air inlet and surrounded by a plurality of fins and storage chambers coupled with the interior volume of the container;
   wherein when the lid is in the sealed position on the container, the motorized air movement mechanism is operating, and one or more thermal energy storage components are disposed in a plurality of storage chambers within the interior volume of the container, then ambient air is drawn through the plurality of storage chambers, into the interior volume of the container and across the one or more thermal energy storage components, through the central air channel of the multi-channel directional airflow manager, the ambient air being converted to thermally modified air via convection with the one or more thermal energy storage components, the thermally modified air then continuing through the central air channel, into the air inlet, and out through the return port as return air having a different temperature from the ambient air drawn through the at least one air intake port.

* * * * *